(12) United States Patent
Girard et al.

(10) Patent No.: US 8,800,820 B2
(45) Date of Patent: Aug. 12, 2014

(54) LIQUID CONCENTRATE/EXTRACT BEVERAGE DISPENSER WITH REPLACEABLE CONCENTRATE/EXTRACT CARTRIDGE

(75) Inventors: Jeffrey J. Girard, Gilbert, AZ (US); Nasser Pirshafiey, Thousand Oaks, CA (US); Mario E. Vassaux, Scottsdale, AZ (US); Heather B. Kay, Mesa, AZ (US); Shlomo Greenwald, Ithaca, NY (US); Zipora Greenwald, Ithaca, NY (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 0 days.

(21) Appl. No.: 13/540,139

(22) Filed: Jul. 2, 2012

(65) Prior Publication Data
US 2013/0002108 A1    Jan. 3, 2013

Related U.S. Application Data

(63) Continuation of application No. 12/114,050, filed on May 2, 2008, now Pat. No. 8,210,396, which is a continuation of application No. PCT/US2006/042878, filed on Nov. 2, 2006, which is a continuation of application No. 11/266,695, filed on Nov. 3, 2005, now Pat. No. 7,651,015.

(60) Provisional application No. 60/794,777, filed on Apr. 25, 2006, provisional application No. 60/845,310, filed on Sep. 18, 2006.

(51) Int. Cl.
*B65D 88/54*    (2006.01)

(52) U.S. Cl.
USPC ........... 222/325; 222/333; 222/504; 222/544; 99/275; 417/44.1; 251/129.01; 137/614.11; 137/852

(58) Field of Classification Search
USPC ............ 222/1, 60–62, 95–96, 100, 105, 107, 222/129.1, 183, 212, 214, 333, 399, 425, 222/447, 449–450, 453, 504, 510, 518, 544, 222/570, 640–641, 651, 325–327; 137/614.11, 528, 852, 903; 99/275, 99/323.3; 251/129.01; 417/44.1, 417; 68/17 R; 134/56 D, 57 D, 58 D
See application file for complete search history.

(56) References Cited

U.S. PATENT DOCUMENTS

| 1,949,661 A | 5/1934 | Schell |
| 2,254,833 A | 9/1941 | Ashkenaz |

(Continued)

FOREIGN PATENT DOCUMENTS

| DE | 2921579 | 11/1980 |
| DE | 19523816 | 1/1997 |

(Continued)

*Primary Examiner* — Paul R Durand
*Assistant Examiner* — Andrew P Bainbridge
(74) *Attorney, Agent, or Firm* — Volpe and Koenig, P.C.

(57) ABSTRACT

A concentrate/extract cartridge for dispensing a liquid concentrate/extract is provided. The cartridge includes a hollow body and a dispensing tube that contains a pumping device. The cartridge includes a valve having a valve stem that passes through a port of a valve seat connected to the dispensing tube. A piston is located at a first end of the valve stem and a valve body is located at a second end of the valve stem in removable contact with the valve seat for alternately opening and closing the port. A liquid dispenser suitable for numerous applications and having a removably insertable concentrate/extract cartridge and a method of dispensing a liquid are also provided.

13 Claims, 31 Drawing Sheets

(56) References Cited

U.S. PATENT DOCUMENTS

| | | | |
|---|---|---|---|
| 2,554,570 A * | 5/1951 | Harvey | 222/207 |
| 2,682,984 A | 7/1954 | Melikian et al. | |
| 2,740,553 A * | 4/1956 | Maynard | 222/2 |
| 2,887,255 A * | 5/1959 | Bauerlein | 222/453 |
| 2,979,231 A | 4/1961 | Witherspoon, Jr. | |
| 3,024,718 A | 3/1962 | Morrison | |
| 3,207,079 A * | 9/1965 | Cook et al. | 418/135 |
| 3,258,166 A | 6/1966 | Kückens | |
| 3,264,973 A | 8/1966 | Tavera | |
| 3,532,505 A | 10/1970 | Cornelius | |
| 3,634,107 A | 1/1972 | Cornelius | |
| 3,641,918 A | 2/1972 | Schellgell et al. | |
| 3,719,505 A | 3/1973 | Mazza | |
| 3,727,632 A | 4/1973 | Pansini | |
| 3,828,985 A | 8/1974 | Schindler | |
| 4,011,969 A | 3/1977 | Martin | |
| 4,015,755 A | 4/1977 | Lerner et al. | |
| 4,096,893 A | 6/1978 | Harvey, Jr. et al. | |
| 4,164,964 A | 8/1979 | Daniels | |
| 4,334,640 A | 6/1982 | van Overbruggen | |
| 4,356,937 A | 11/1982 | Simon et al. | |
| 4,393,982 A | 7/1983 | Kückens | |
| 4,450,987 A * | 5/1984 | Boettcher et al. | 222/641 |
| 4,470,999 A | 9/1984 | Carpiac | |
| 4,471,689 A | 9/1984 | Piana | |
| 4,503,507 A | 3/1985 | Takeda et al. | |
| 4,515,294 A | 5/1985 | Udall | |
| 4,518,105 A * | 5/1985 | Kuckens et al. | 222/207 |
| 4,550,858 A | 11/1985 | Noomen | |
| 4,598,845 A * | 7/1986 | Ozdemir | 222/449 |
| 4,624,395 A | 11/1986 | Baron et al. | |
| 4,660,742 A | 4/1987 | Ozdemir | |
| 4,708,266 A | 11/1987 | Rudick | |
| 4,722,372 A | 2/1988 | Hoffman et al. | |
| 4,791,859 A | 12/1988 | King | |
| 4,808,346 A | 2/1989 | Strenger | |
| 4,901,886 A | 2/1990 | Kirschner | |
| 4,901,890 A | 2/1990 | Mivelaz | |
| 4,903,586 A | 2/1990 | King | |
| 4,921,131 A | 5/1990 | Binderbauer et al. | |
| 5,025,714 A | 6/1991 | Brewer | |
| 5,111,740 A | 5/1992 | Klein | |
| 5,114,047 A | 5/1992 | Baron et al. | |
| 5,154,319 A | 10/1992 | Deininger et al. | |
| 5,188,019 A | 2/1993 | Vahabpour | |
| 5,190,652 A | 3/1993 | van Thoor et al. | |
| 5,193,593 A | 3/1993 | Denis et al. | |
| 5,197,865 A | 3/1993 | Sevrain et al. | |
| 5,269,443 A | 12/1993 | Lancaster | |
| 5,275,309 A * | 1/1994 | Baron et al. | 222/129.1 |
| 5,295,611 A | 3/1994 | Simard | |
| 5,312,017 A | 5/1994 | Schroeder et al. | |
| 5,332,123 A | 7/1994 | Farber et al. | |
| 5,353,963 A | 10/1994 | Gorski et al. | |
| 5,615,801 A | 4/1997 | Schroeder et al. | |
| 5,656,316 A | 8/1997 | Fond et al. | |
| 5,662,461 A * | 9/1997 | Ono | 417/418 |
| 5,740,719 A | 4/1998 | Triola et al. | |
| 5,836,482 A | 11/1998 | Ophardt et al. | |
| 5,842,603 A | 12/1998 | Schroeder et al. | |
| 5,895,672 A | 4/1999 | Cooper | |
| 5,909,846 A | 6/1999 | Sasaki | |
| 5,918,768 A | 7/1999 | Ford | |
| 5,975,357 A | 11/1999 | Topar | |
| 5,992,685 A | 11/1999 | Credle, Jr. | |
| 6,073,539 A | 6/2000 | Triola et al. | |
| 6,161,722 A | 12/2000 | Sooudi et al. | |
| 6,173,117 B1 | 1/2001 | Clubb | |
| 6,209,751 B1 | 4/2001 | Goodin et al. | |
| 6,257,445 B1 * | 7/2001 | Means et al. | 222/1 |
| 6,343,724 B1 | 2/2002 | Ophardt et al. | |
| 6,394,312 B1 | 5/2002 | Endou | |
| 6,564,968 B1 | 5/2003 | Terrell et al. | |
| 6,568,565 B1 | 5/2003 | Schroeder et al. | |
| 6,589,577 B2 | 7/2003 | Lazaris et al. | |
| 6,607,762 B2 | 8/2003 | Lazaris et al. | |
| 6,644,173 B2 | 11/2003 | Lazaris et al. | |
| 6,651,849 B2 | 11/2003 | Schroeder et al. | |
| 6,662,976 B2 | 12/2003 | Jensen et al. | |
| 6,676,908 B2 | 1/2004 | Robinson, Sr. et al. | |
| 6,698,333 B2 | 3/2004 | Halliday et al. | |
| 6,722,527 B1 | 4/2004 | Krauss | |
| 6,740,345 B2 | 5/2004 | Cai | |
| 6,808,731 B1 | 10/2004 | Gutwein et al. | |
| 6,810,931 B2 | 11/2004 | Graffin et al. | |
| 6,886,556 B2 | 5/2005 | Fuchs | |
| 6,974,052 B1 | 12/2005 | D'hond et al. | |
| 6,990,391 B1 | 1/2006 | Cunha et al. | |
| 7,048,149 B1 | 5/2006 | Lassota | |
| 7,077,339 B2 | 7/2006 | Leach | |
| 7,104,184 B2 | 9/2006 | Biderman et al. | |
| 7,182,280 B2 | 2/2007 | Ye et al. | |
| 7,578,419 B2 | 8/2009 | Greenwald et al. | |
| 7,896,202 B2 | 3/2011 | Greenwald et al. | |
| 2002/0148356 A1 | 10/2002 | Lazaris et al. | |
| 2003/0145736 A1 | 8/2003 | Green | |
| 2004/0074921 A1 | 4/2004 | Lips et al. | |
| 2004/0084475 A1 | 5/2004 | Bethuy et al. | |
| 2004/0226962 A1 | 11/2004 | Mazursky et al. | |
| 2006/0144244 A1 | 7/2006 | Girard et al. | |
| 2006/0283889 A1 | 12/2006 | Mink et al. | |
| 2008/0029541 A1 | 2/2008 | Wallace et al. | |
| 2009/0057341 A1 | 3/2009 | Girard et al. | |

FOREIGN PATENT DOCUMENTS

| | | |
|---|---|---|
| EP | 0067466 | 12/1982 |
| FR | 2813861 | 3/2002 |
| JP | 3129494 | 6/1991 |
| JP | 6211299 | 8/1994 |
| NL | 1003894 | 5/1998 |
| RU | 2086169 | 8/1997 |
| WO | 89/01751 | 3/1989 |
| WO | 91/18826 | 12/1991 |
| WO | 99/37577 | 7/1999 |
| WO | 00/79224 | 12/2000 |
| WO | 01/49154 | 7/2001 |
| WO | 02/081354 | 10/2002 |
| WO | 2004/104527 | 12/2004 |
| WO | 2005/070816 | 8/2005 |
| WO | 2005/071267 | 8/2005 |
| WO | 2005/079361 | 9/2005 |

* cited by examiner

LIQUID CONCENTRATE/EXTRACT BEVERAGE DISPENSER WITH REPLACEABLE CONCENTRATE/EXTRACT CARTRIDGE

CROSS REFERENCE TO RELATED APPLICATIONS

This application is a continuation of U.S. application Ser. No. 12/114,050 filed May 2, 2008, which is a continuation of International Application PCT/US2006/042878 filed Nov. 2, 2006, which is a continuation of U.S. application Ser. No. 11/266,695 filed Nov. 3, 2005; a non-provisional of U.S. Provisional Application No. 60/794,777 filed Apr. 25, 2006; and a non-provisional of U.S. Provisional Application No. 60/845,310 filed Sep. 18, 2006, all which are incorporated by reference as if fully set forth.

BACKGROUND

The present invention relates to a concentrate/extract cartridge for a beverage dispenser for dispensing a liquid concentrate/extract and a diluent. In a broader sense, the invention also provides a concentrate/extract pump and dispensing system that can be utilized in a number of different dispensing applications, with or without a diluent.

Another embodiment of the present invention relates to dispensing systems which dispense fluids in an exact metered fashion. More particularly, the invention relates to dispensing systems used by consumers for completing a variety of tasks to increase efficiency.

Beverage dispensers are known for making a beverage from a liquid concentrate/extract. In one known prior art reference, a pressurized liquid canister of liquid beverage concentrate/extract is placed within a pitcher-shaped device having a mechanism for releasing a predetermined amount of liquid concentrate/extract from the pressurized canister into a beverage mixing chamber. A heated liquid reservoir is located at the bottom of the vessel and heated liquid is also forced upwardly into the mixing chamber where the mixed beverage is formed in the device prior to being poured. This device has several drawbacks due to the complex nature of the dispensing mechanism and the need to clean out the mixing chamber in the device after each use. It is also known to provide a coffee machine for use with shelf-stable liquid coffee concentrate/extract. The liquid coffee concentrate/extract is poured into a reservoir in the coffee maker and a predetermined amount of the concentrate/extract is moved from the reservoir to the brewing chamber, where it is mixed with heated water prior to being dispensed into a carafe. While this device overcomes the need for coffee filters and ground coffee and allows the use of a shelf-stable liquid coffee concentrate/extract, the entire machine must be cleaned after use, due to the fact that the coffee concentrate/extract is poured into the coffee machine prior to being delivered to a brewing chamber in the machine. Additionally, it is not possible to switch the type of beverage being dispensed in an easy and convenient manner.

Another problem with many known beverage dispensers which combine concentrate/extract and water is a poor mixing of the concentrate/extract and water. Such known dispensers often dispense a stream of concentrate/extract and water which is not adequately mixed, and accordingly, lacking homogeneity. Complete mixing does not take place until the fluids enter a user's cup. Many users consider a stream of non-homogeneous beverage to be visually unappealing and indicative of a lack of quality of the beverage dispenser or beverage being dispensed. An unmixed stream of concentrate/extract and water dispensed by a beverage dispenser is sometimes identified by the trade term "striping" or as the "zebra effect".

It has also been suggested to provide a beverage system for brewing a beverage from a dry beverage material and a source of hot, pressurized water. The beverage material is provided in a sealed cartridge and the dispenser pierces the sealed cartridge and injects hot, pressurized water into the cartridge to brew the beverage from the beverage material. A carousel device may be provided, which allows a user to select from one of several different beverage cartridges. However, a drawback of this device is that residue from a previous beverage will remain in the hot, pressurized water-injecting area as well as in the downstream collection funnel, which directs the beverage into a user's cup. Further, in the case of typical beverage systems of this type for producing hot coffee drinks, dry coffee material including instant, non-brewed coffee product is provided. Such non-brewed coffee product typically produces coffee beverages which to at least some extent lack the distinct flavor of brewed coffee.

It would be desirable to provide a more convenient and easy way to mix and dispense multiple types of beverages from a single-beverage dispenser in a convenient and user friendly manner, and also without the need for cleaning the dispenser when a user wishes to change the type of beverage being dispensed. It would also be desirable to allow a user to select a beverage strength from a number of different selections so that a user's preference can be satisfied. It would also be desirable to provide a beverage dispenser that allows a user to dispense an exact desired amount of beverage and that does not waste excess beverage concentrate/extract in a user's container or in the dispenser itself. It would be further desirable to allow a user to select from multiple beverage types and to select from multiple beverage container sizes, such as coffee mugs or disposable cups having different sizes while still providing the beverage at a desired strength. Further, it would be desirable to provide a beverage dispenser which dispenses a mixture of concentrate/extract and water or other diluent which is well-mixed and homogeneous prior to entering a user's container.

Additionally other consumable products such as baby formulas, detergents, and medicines are often cumbersome to mix and/or dispense in proper amounts, and require appreciable amounts of storage space. It would be desirable to provide a system which allows for the dispensing of liquid consumable products in a manageable and convenient manner for a number of different applications. It would also be desirable to allow a user to select a concentration or strength from a number of different selections so that a specific need or user's preference can be satisfied. It would also be desirable to provide a dispenser that allows a user to dispense an exact desired amount of product and that does not waste excess concentrate/extract in a user's container or in the dispenser itself. It would be further desirable to allow a user to select from multiple product types and to select from multiple container sizes, while still providing a product at a desired strength. Further, it would be desirable to provide a dispenser which dispenses a mixture of concentrate/extract and water or other diluent which is well-mixed and homogeneous prior to entering a container.

SUMMARY

The present invention provides a concentrate/extract cartridge for a dispenser for dispensing a liquid concentrate/extract and a diluent. The cartridge includes a hollow body and a dispensing tube connected to the hollow body. A piston is slideably contained by an interior surface of the dispensing tube. The cartridge includes a valve having a valve stem that passes through a port of a valve seat connected to the dispensing tube. The port defines a flow passage through the dispensing tube. The valve stem is provided with a valve body located at a second end of the valve stem, the valve body being in removable contact with the valve seat for alternately opening and closing the port. A piston is also provided. In a preferred embodiment, the piston is connected to a first end of the valve stem and includes a membrane positioned on a side facing the valve stem. The membrane is configured to permit a flow of fluid into the dispensing tube when the valve body is in contact with the valve seat and to permit the fluid to be forcibly expressed from the dispensing tube when the piston is moved downwardly and the valve body is moved from its contact position with the valve seat.

Another embodiment of the present invention is a liquid dispensing system which uses a removably insertable concentrate/extract cartridge. The liquid dispensing system includes a housing with a cartridge receiving area, and a dispensing actuator located in the housing. A cartridge which includes a dispensing aperture is positioned in the receiving area to dispense the liquid into a dispensing area. A controller is located in the housing to control the actuator to discharge the liquid from the cartridge into the dispensing area. This liquid dispenser can be used in various dispensing applications, including bottle office-style hot/cold water dispensers, a baby formula dispenser, a medicine dispenser, dish washers, washing machines, and home and commercial refrigerators.

BRIEF DESCRIPTION OF THE DRAWING(S)

The preferred embodiments of the present invention are described below with reference to the drawing figures where like numerals represent like elements throughout.

DETAILED DESCRIPTION OF THE PREFERRED EMBODIMENT(S)

Figure 1:
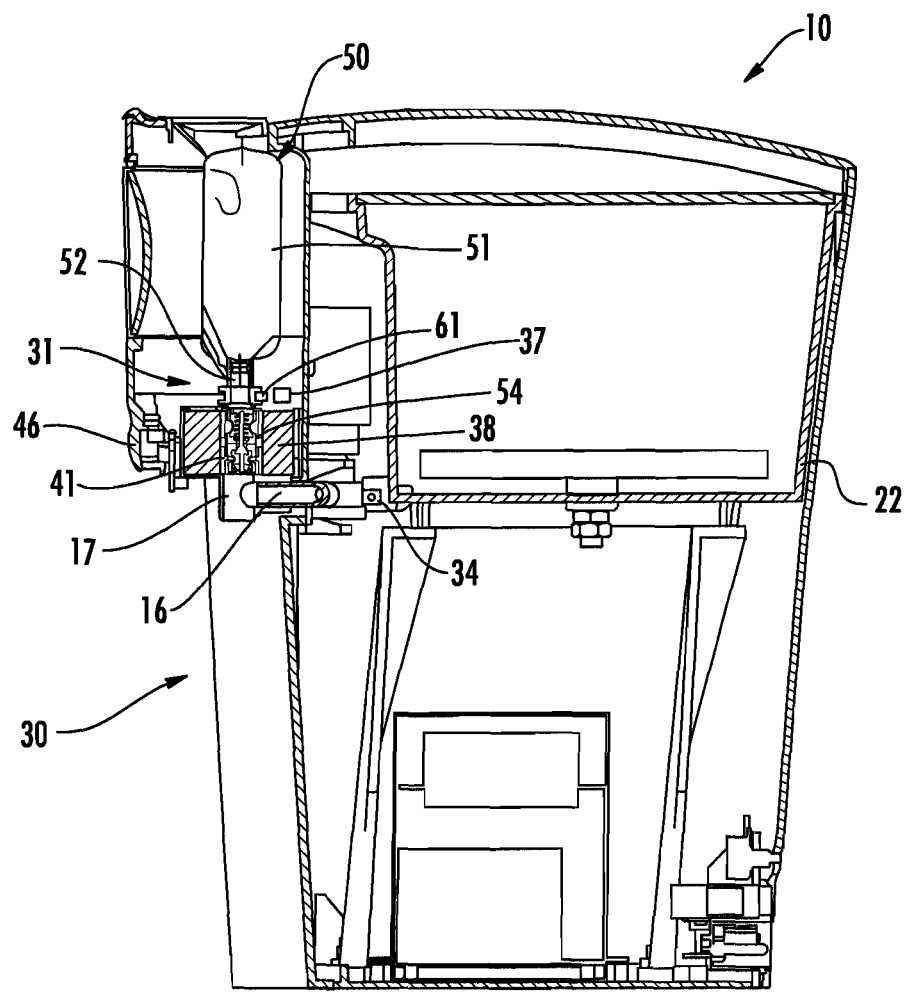
FIG. 1 is a cross-sectional view of a concentrate/extract cartridge in a liquid dispenser.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted. The phrase "at least one" followed by a list of two or more items, such as "A, B, or C," means any individual one of A, B or C as well as any combination thereof.

FIGS. 1-4, show a beverage dispenser 10 for use with a liquid/extract cartridge 50, adapted to dispense a beverage comprising a liquid extract (designated by arrows 12 in a dispensing area 30 in FIG. 2) and a diluent 14 (in a reservoir 22 and designated by arrows 14 in FIG. 2) is provided. The dispenser 10 functions in a manner similar to Applicant's prior dispenser. For use with warm beverages the diluent reservoir 22 may be heated by a heating element.

Figure 2:
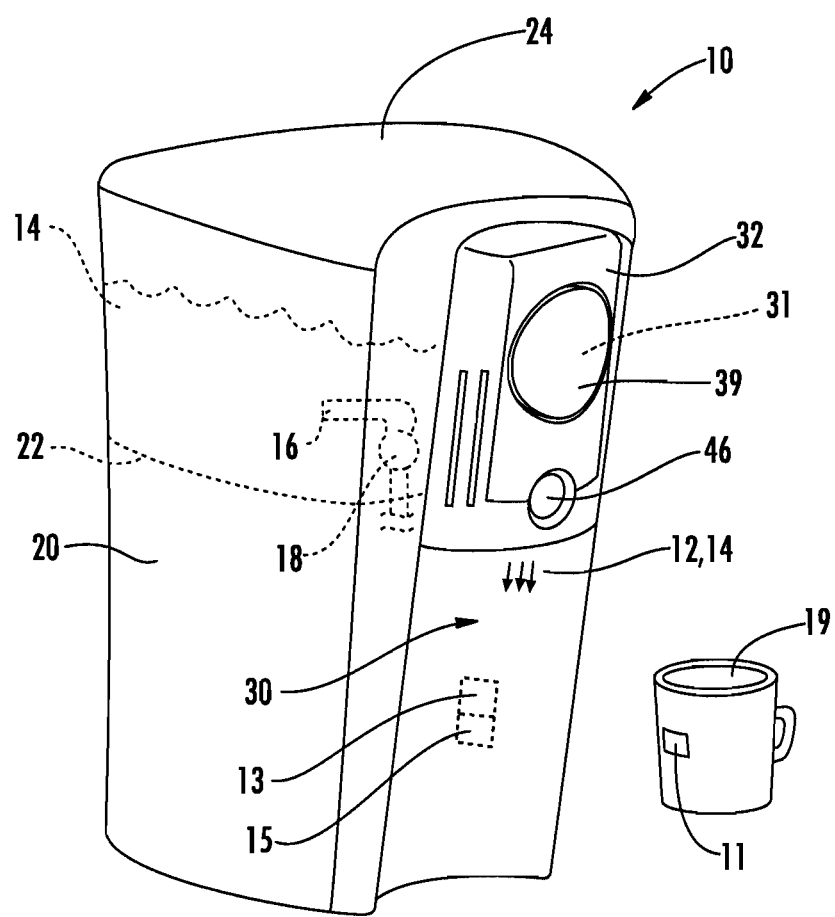
FIG. 2 is a left side perspective view of a beverage dispenser of FIG. 1.
Figure 3:
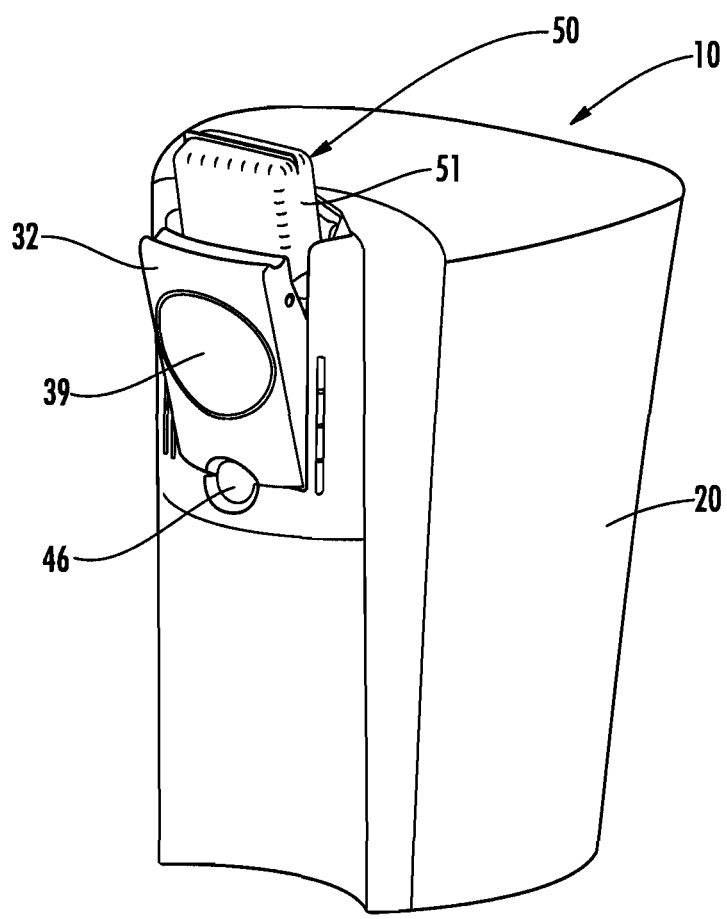
FIG. 3 is a perspective view of the dispenser with the access door for the concentrate/extract cartridge opened for insertion or removal of the cartridge.
Figure 4:
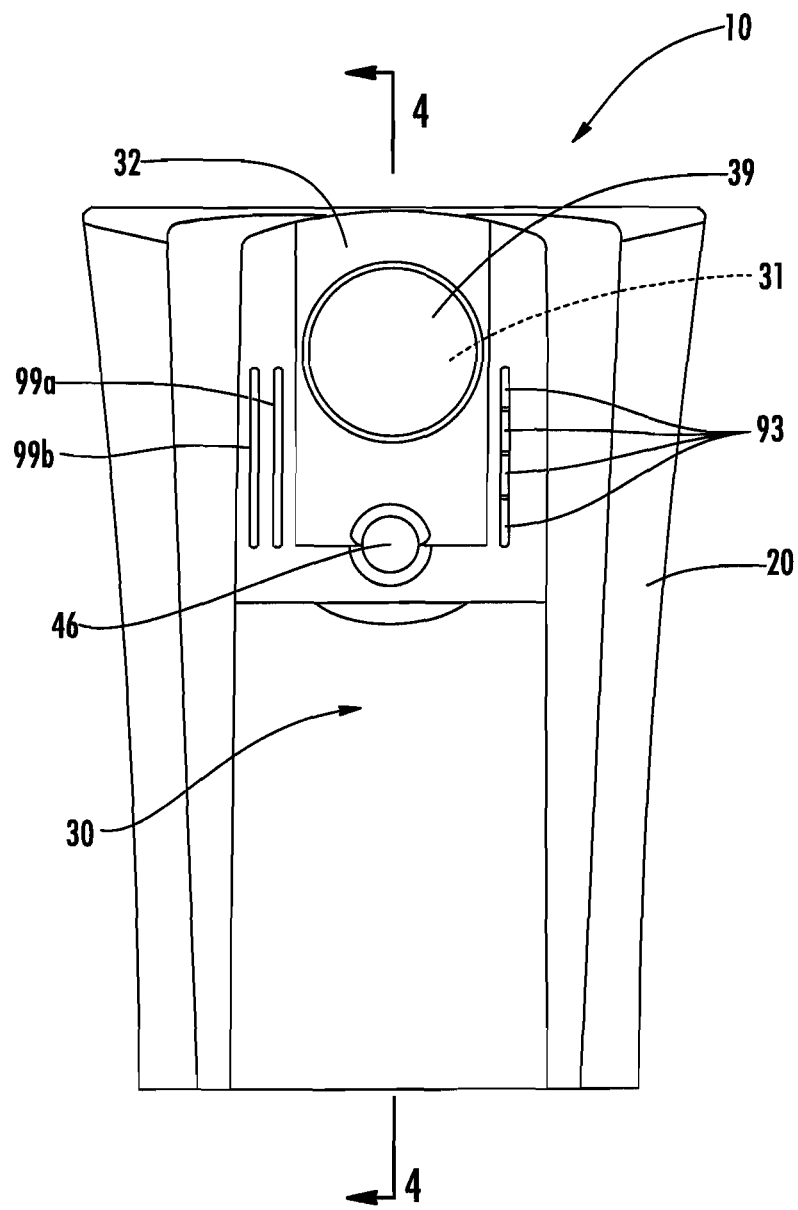
FIG. 4 is a front elevation view of the dispenser of FIG. 1.
Figure 5:
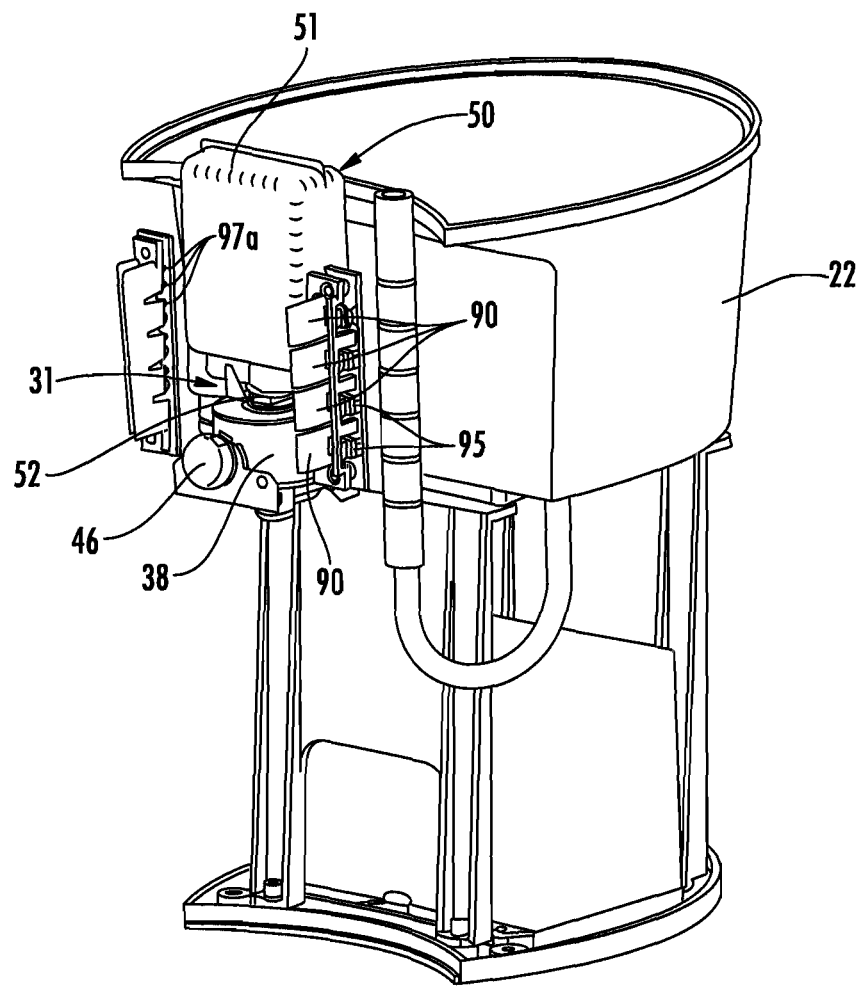
FIG. 5 is a right side perspective view of the beverage dispenser of FIG. 5 with the housing removed.
Figure 6:
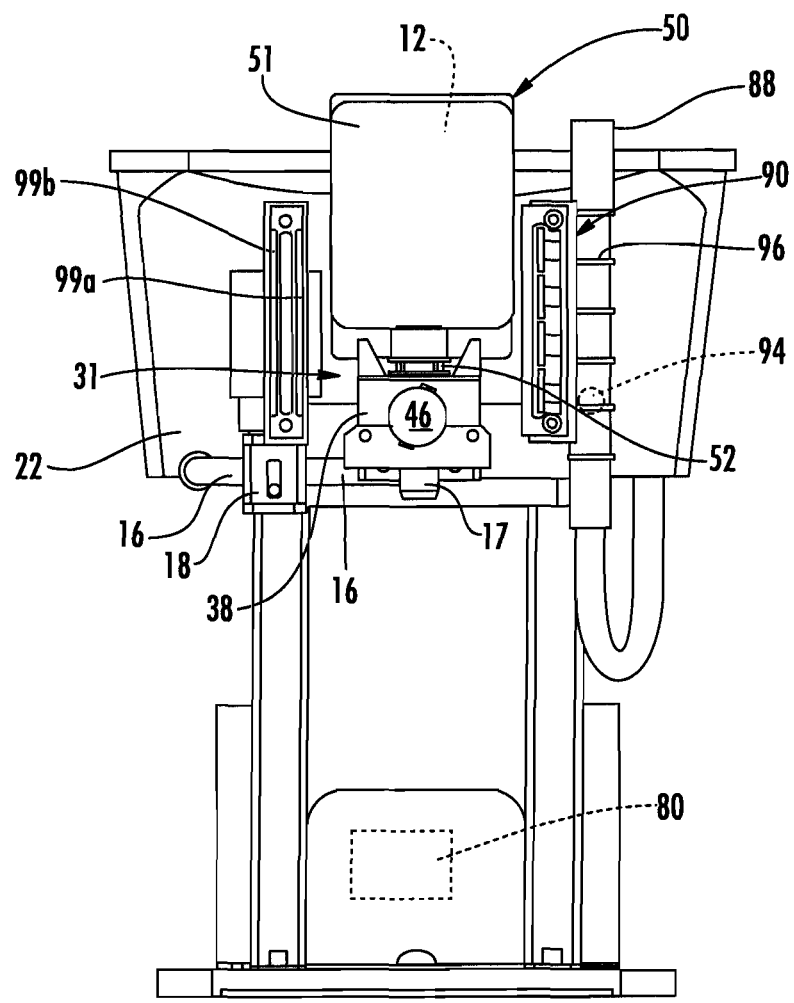
FIG. 6 is a front elevational view of the beverage dispenser of FIG. 5 with the housing removed.
Figure 7:
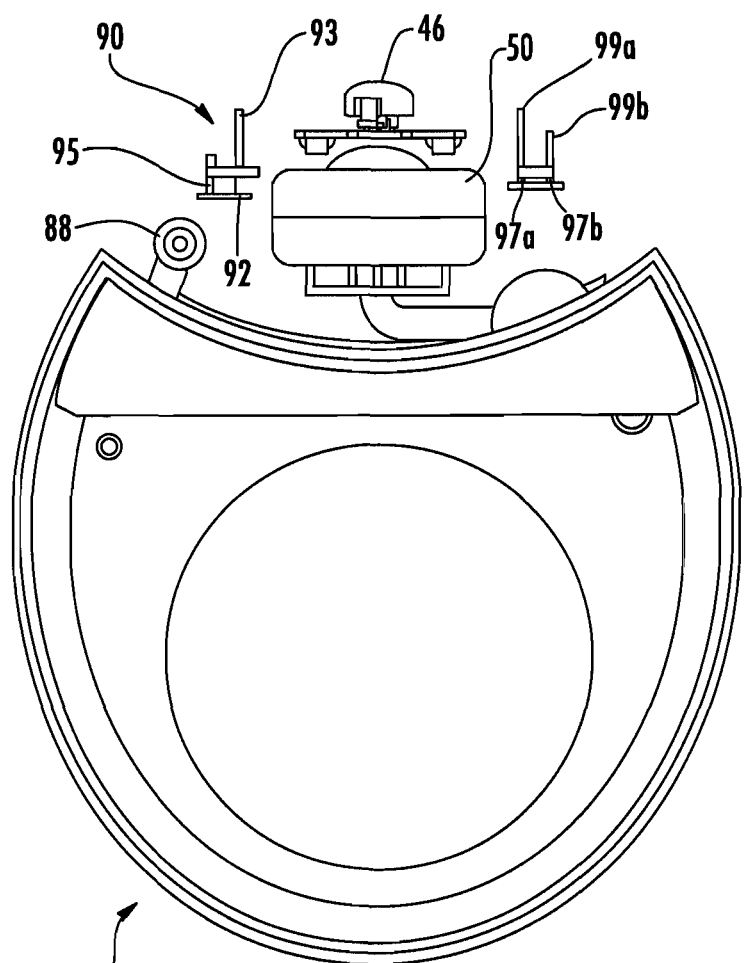
FIG. 7 is top plan view of the beverage dispenser of FIG. 5 with the housing removed.
Figure 8:
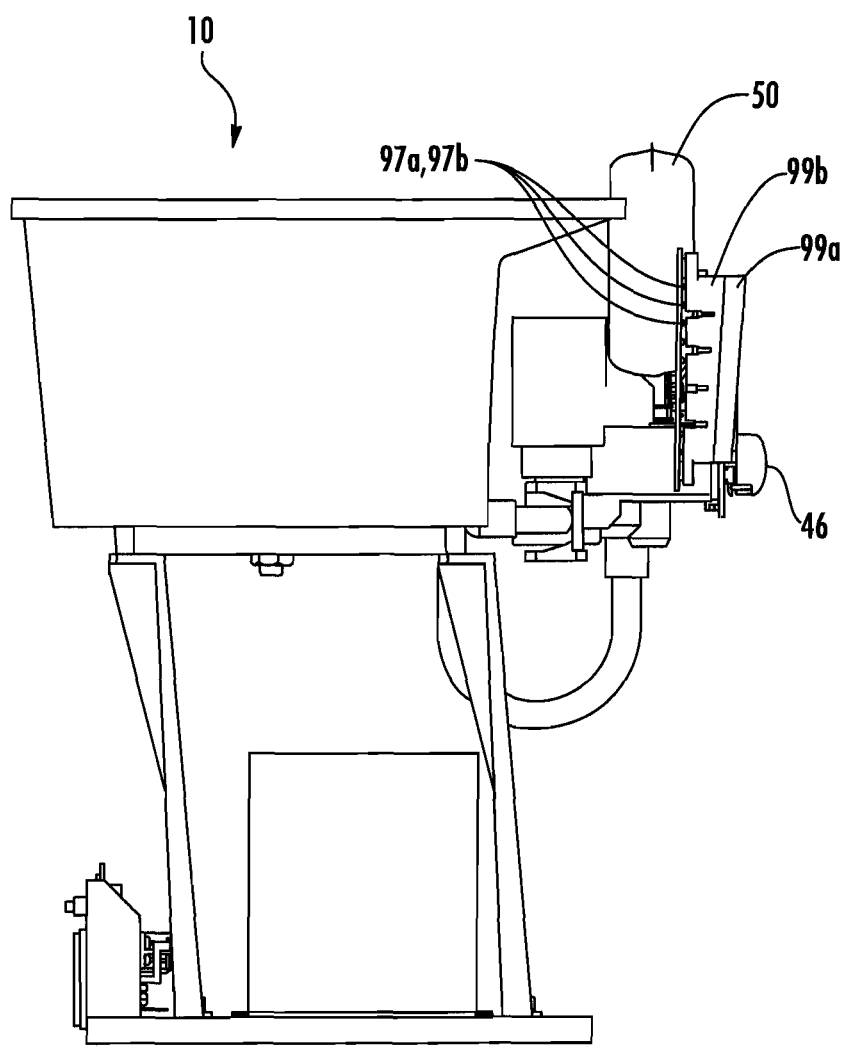
FIG. 8 is a left side elevational view of the beverage dispenser of FIG. 5 with the housing removed.
Figure 9:
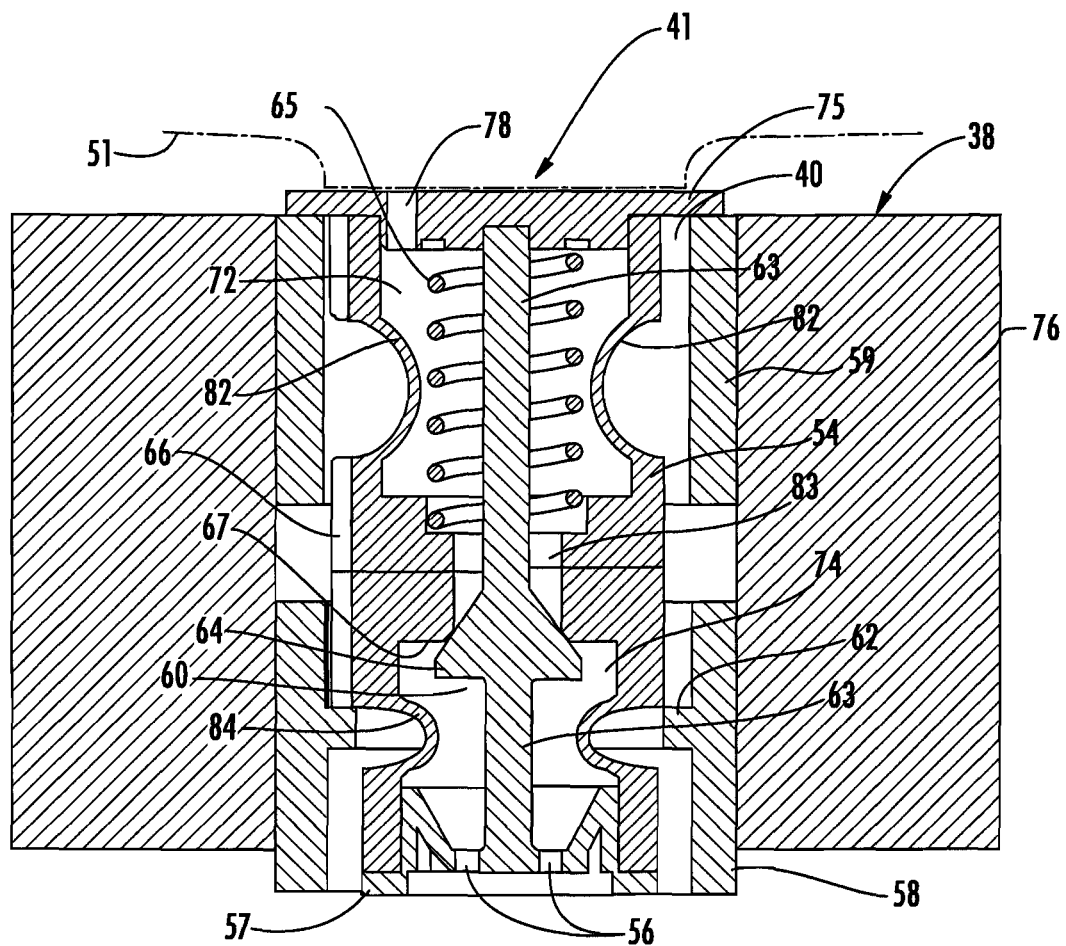
FIG. 9 is a cross sectional view showing a first embodiment of the pump device of the cartridge located in a dispensing actuator shown in a closed position.

As shown in FIGS. 1, 2 and 6, preferably a reservoir supply line 16 is connected to the reservoir 22 and delivers the diluent 14 to the dispensing area. The supply line 16 is preferably connected to a control valve 18 that can dispense water from the reservoir to the dispensing area at varying rates. The control valve 18 is preferably a solenoid driven pinch valve, as shown; however, any suitable control valve can be used. Alternatively, the supply line 16 could be connected to a pump for emptying diluent 14 from the reservoir 22. Preferably, as shown in FIGS. 5-7, a level sensor 88 is connected to the reservoir 22 which can be used by a controller 80 to determine diluent flow rate information. The level sensor 88 can be a float 94 arrangement that either provides the level information directly, for example by a lever attached to the float 94, or indirectly, such as by the float 94 being magnetic and tripping magnetic switches set at different levels on the outside of the reservoir 22, or by any other suitable means. This information is preferably used by the controller 80 to adjust a rate of actuation of a dispensing actuator 38, as described below, to dispense a desired amount of concentrate/extract 12 relative to an amount of dispensed diluent 14. Alternatively, based on the diluent flow rate information received, the controller 80 can control the control valve 18, or alternatively a diluent discharge pump, permitting discharge of an appropriate amount of diluent 14 relative to an amount of dispensed concentrate/extract 12. As an alternative to the level sensor, a flow rate sensor could be provided in the supply line 16 in order to measure flow rate information.

As shown in FIGS. 1 and 5-7, the concentrate extract cartridge 50 includes a hollow body 51 for containing the liquid concentrate/extract 12. The hollow body 51 is preferably collapsible and fabricated from a flexible laminate sheet including layers of one or more of polyethylene, polyester, and metallic foil. Alternatively, other suitable materials can be used to create the flexible laminate sheet. A spout connector 52 is preferably sealably connected to the hollow body 51. An inner layer of the hollow body 51 preferably includes features, such as sealing areas, which contact and align with cooperating features on the connector 52. During assembly, heat and pressure is applied for a predetermined period of time to the area where the hollow body 51 and the connector 52 are in contact, sealably connecting the hollow body 51 to the connector 52. Preferably, the inner layer of the hollow body 51 and the connector 52 are made of the same material, for example polyethylene, or otherwise made of compatible materials, so that when heat and/or pressure are applied, the hollow body 51 and connector 52 are sealed together. Alternatively, the connector 52 can be adhered to the hollow body 51 using any suitable adhesive and/or adhering method.

A pump device, such as the device 41 in FIG. 1, is connected to the spout connector 52. The pump device is preferably adhered or mechanically fastened to the spout connector 52. Alternatively, the pump device 41 can be integrally formed with the spout connector 52. Referring to the FIGS. 9-13, a first embodiment of the pump device 41 is shown in detail and includes an axially resilient dispensing tube 54 connected to a cap 75 which preferably provides the connection to the spout connector 52. The dispensing tube 54 may be fabricated from a single piece or multiple pieces connected together as shown. The cap 75 includes apertures 78 which allow liquid concentrate/extract 12 to pass from the hollow body 51 into the axially resilient dispensing tube 54. The dispensing tube 54 includes accordion-like top and bottom flexing members 82, 84 which permit volumetric adjustment of top and bottom chambers 72, 74 of the pump device 41. A valve 60 is formed by a center portion of the resilient tube which has an increased wall thickness so that it acts like a piston and which includes having a port 83 for passing a flow of fluid concentrate/extract 12 therethrough that ends at a valve seat 67. A valve stem 63 preferably having an integrally formed valve body 64 for alternately covering and uncovering the port 83 in the valve seat 67 extends through the valve body 64 and is connected to an end cap 57 at a first end thereof and connected to the top cap 75 at a second end thereof. The end cap 57 is preferably rigidly connected to an end of the dispensing tube 54. The end cap 57 includes through apertures 56, for passing a flow of the liquid concentrate/extract 12 out of the pump device 41. A spring 65 is preferably provided to bias the top flexing member 82 toward an extended position closing the valve seat 67 with the valve body 64 and resulting in the maximization of the volume of the top chamber 72 absent an application of external force. Alternatively, the spring 65 can be omitted and the flexing member 82 can be configured to provide sufficient resilience to maximize the volume of the top chamber 72.

Referring to FIGS. 1, 5-6 and 10, a dispensing actuator 38 is fixed within the cartridge receiving area 31 and includes an opening 40 for receiving the pump device 41 of the cartridge 50 therein. The dispensing actuator 38 also includes an electromagnet 76 which preferably comprises a wound coil or solenoid arrangement. The wound coil or solenoid can include one or more focusing rings located inside the coil to focus the magnetic flux generated.

In one embodiment for use with the first cartridge 50, a sliding ferromagnetic sleeve 58 is preferably concentrically aligned with the electromagnet 76. Preferably, a ferromagnetic stop member 59 is connected to the dispensing actuator 38 limiting the motion of the sliding sleeve 58 and channeling magnetic flux produced by the electromagnet 76. The ferromagnetic sleeve 58 includes a circumferential protrusion 62. When the cartridge 50 is in an installed position in the receiving area 31, bearing members 66 on the center portion of the resilient tube contact the circumferential protrusion 62 of the sliding ferromagnetic sleeve 58.

The electromagnet 76 receives current, such as alternating or direct current, from the controller 80. In a preferred embodiment, the controller 80 intermittently provides 24 volts over the coil to produce an intermittent direct current which induces an intermittent magnetic field.

Figure 10:
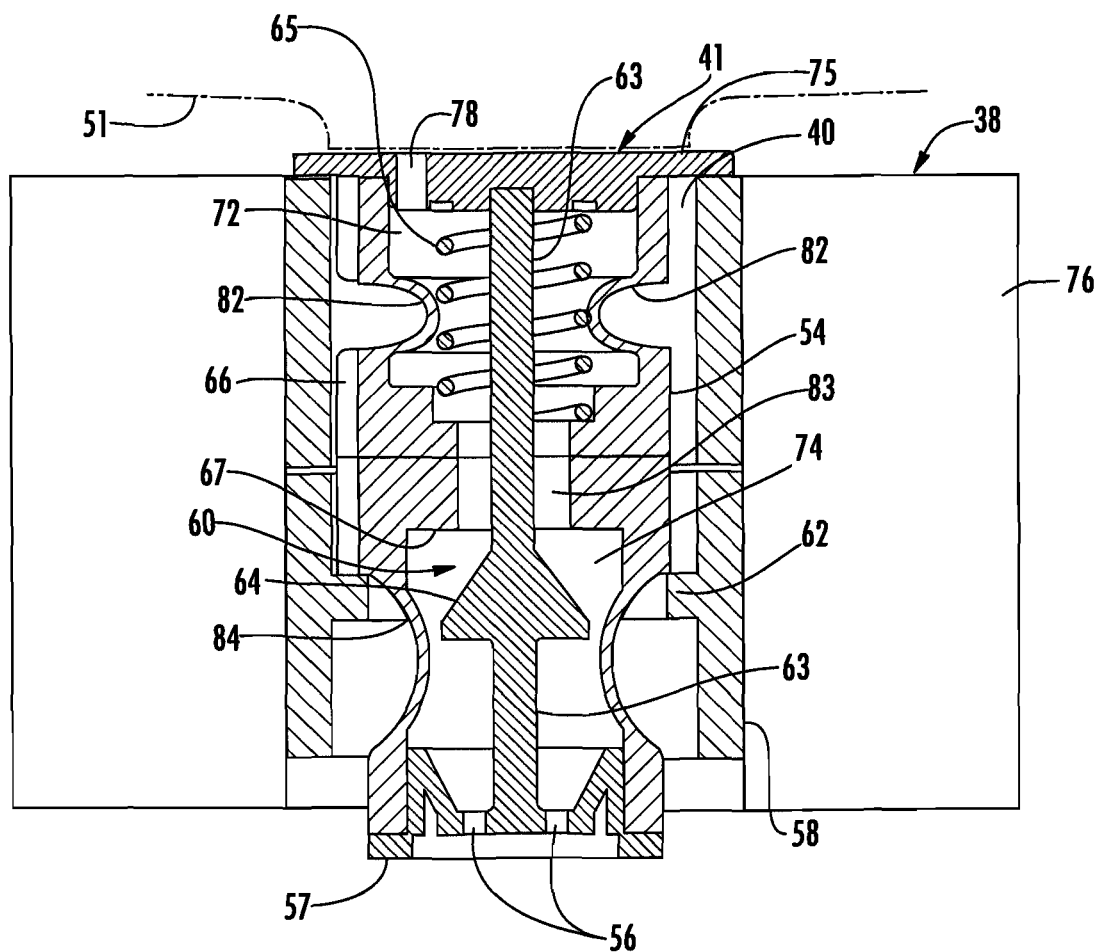
FIG. 10 is a cross-sectional view of the pump device and dispensing actuator of FIG. 9 shown in an open position.
Figure 11:
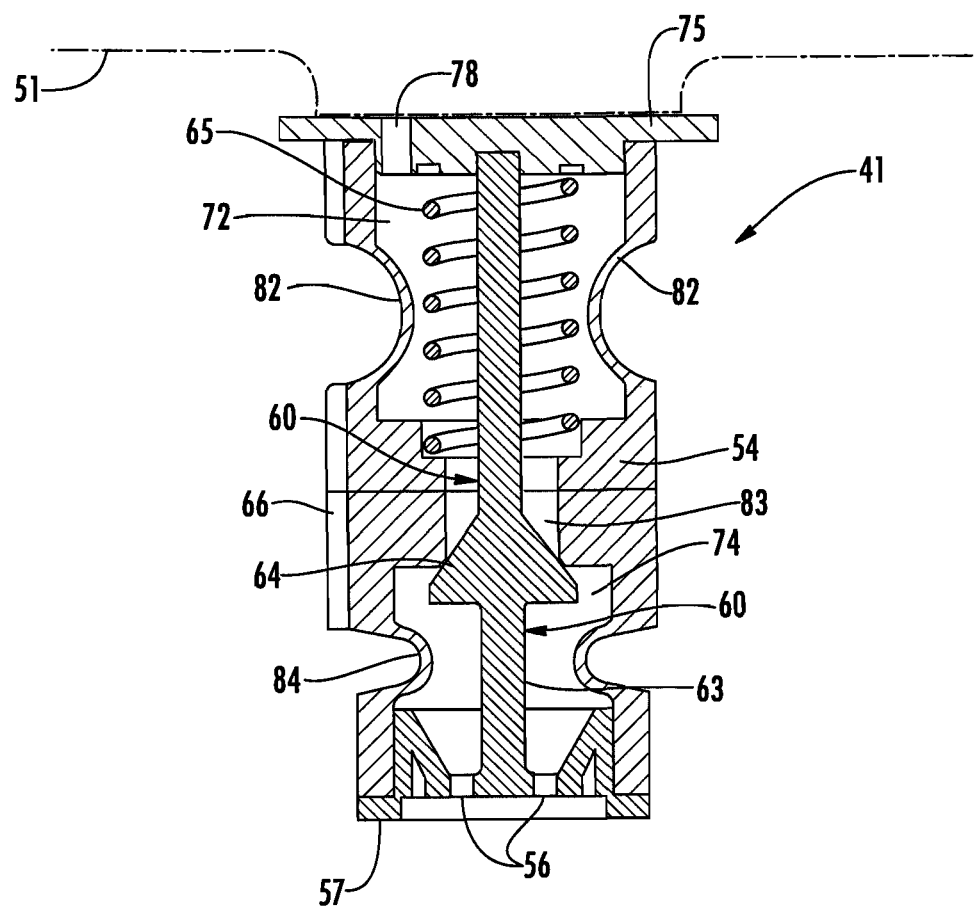
FIG. 11 is a cross-sectional view of the pump device and dispensing actuator of the dispenser of FIG. 9, the pump device and dispensing actuator shown in the closed position.
Figure 12:
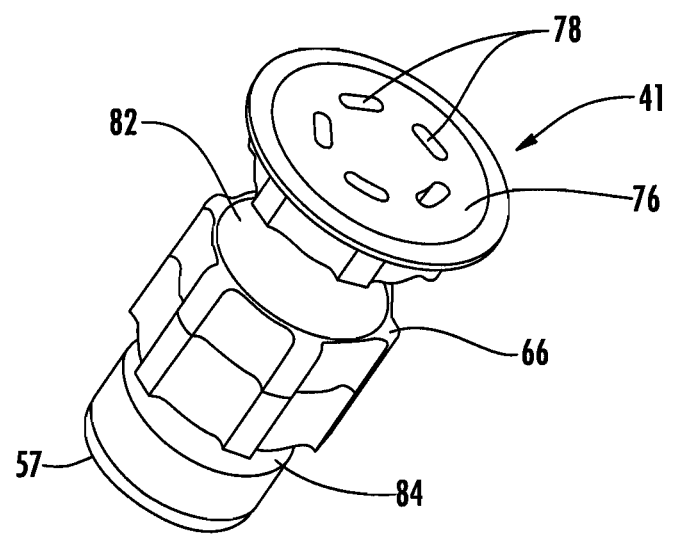
FIG. 12 is a perspective view of the pump device of the beverage dispenser of FIG. 9 showing a top end of the pump device.
Figure 13:
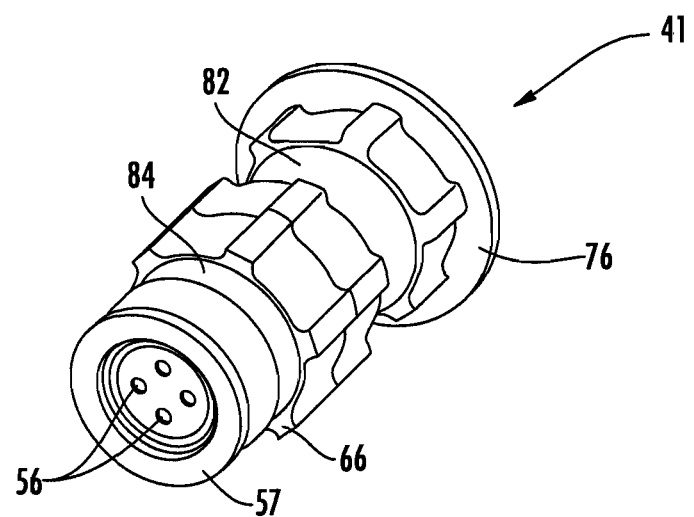
FIG. 13 is a perspective view of the pump device of the beverage dispenser of FIG. 9 showing a bottom end of the pump device.

The cartridge 50 dispenses the liquid concentrate/extract 12 as follows. Current is induced in the wound coil by an applied voltage, preferably 24 volts over the electromagnet 76 as provided by the controller. Alternatively, the controller can provide other suitable voltages for producing alternating or direct current. The application of voltage causes the ferromagnetic sleeve 58 to be drawn from the position shown in FIGS. 9 and 11 toward the electromagnetic center of the electromagnet 76 and against the stop member 59 as shown in FIG. 10. The center position of the tube 54 having the valve seat 67 follows in an upward motion with the ferromagnetic sleeve, displacing the valve seat 67 from the valve body 64 while compressing the top flexing member 82 and extending the bottom flexing member 84, as shown in FIG. 10. During the upward motion of the ferromagnetic sleeve 58, liquid concentrate/extract in the top chamber 72 is forced through the port 83, as it is uncovered by the valve body 64, and into the bottom chamber 74 of the dispensing tube 54. Next, the controller cuts off voltage to the actuator 38, allowing the ferromagnetic sleeve 58 to move downwardly away from the stop member 59 by force of the spring 65 and gravity, forcing the valve seat 67 against the valve body 64, while extending the top flexing member 82 and compressing the bottom flexing member 84. During downward motion of the ferromagnetic sleeve 58, the bottom chamber 74 decreases in volume and fluid concentrate/extract in the bottom chamber is forced through the apertures 56 and out of the pump device 41, while at the same time, fluid concentrate/extract 12 from the hollow body 51 is drawn into the top chamber 72 through the cap apertures 78. The hollow body 51 is preferably collapsible and collapses to facilitate the extraction of fluid concentrate/extract 12 from the hollow body. A voltage, such as the preferred 24V DC producing voltage, or other suitable AC or DC producing voltage, is cycled on and off to provide an intermittent current for repeating the above-described process continuously until a desired amount of the liquid concentrate/extract 12 is dispensed. Alternatively, other types of actuators can be used to act against the circumferential protrusion 62 to compress the flexing member 82.

As shown in FIGS. 1-8, a trigger 46 is provided, which when pressed signals the controller 80 to provide an intermittent current to the electromagnet 76 to initiate the dispensing of the liquid concentrate/extract 12 from the cartridge 50. Referring to FIG. 1, fluid concentrate/extract 12 dispensed from the cartridge 50 preferably enters a joining tube 17 fixed within the cartridge receiving area 31. At the same time, the controller opens the diluent control valve 18 to transfer liquid diluent 14 from the reservoir 22 through the diluent supply line 16 into the joining tube 17. A stream of diluent 14 is preferably dispensed generally into the discharge of the concentrate/extract 12 in close proximity to the dispensing tube 54. In this manner, a uniform and substantially homogenous mixture of concentrate/extract 12 and diluent 14 exits the joining tube 17 into the dispensing area 30. This configuration is useful to prevent dispensing of poorly mixed concentrate/extract, known to those skilled in the art as "striping" or the "zebra effect". Most preferably, the diluent 14 is dispensed generally perpendicular to the discharge of the concentrate/extract 12 as shown to increase mixing.

Preferably, the controller 80 continues to dispense diluent 14 for a short period of time after stopping the dispensing of the concentrate/extract 12 in order to clean the joining tube 17 of residual concentrate/extract 12. Alternatively, the joining tube 17 can be omitted, and the supply line 16 and the dispensing tube 54 of the cartridge 50 are directed such that during dispensing, a stream of discharged concentrate/extract 12 enters a stream of discharged diluent 14 to promote mixing.

Referring to FIGS. 4-8, touch pad input controls 90, preferably including buttons 93 and switches 95, are provided to vary the strength of the beverage allowing a user to select a desired strength of the beverage. Visual indicators such as LEDs 92 indicate a selected beverage strength. Preferably, the buttons 93 are light pipes, as shown, for channeling light from the LEDs 92. Visual indicators such as LEDs 97a project light through light guides 99a to indicate the amount of concentrate/extract 12 remaining. Visual indicators such as LEDs 97b project light through light guides 99b to indicate the amount of diluent 14 remaining in the reservoir 22.

User input from the input controls 90 is used by the controller 80 to determine an amount of concentrate/extract 12 to be mixed with the diluent 14. This can be done by varying the speed by which the diluent 14 is dispensed by the control valve 18, and/or by controlling the electromagnet 76 to vary the rate at which the pump device 41 pumps. Preferably, the diluent 14 is dispensed from the reservoir 22 by gravity, and the liquid concentrate/extract 12 is dispensed from the cartridge 50 at a rate which is dependent on the selected beverage strength. The controller 80 preferably compensates for a decreasing reservoir diluent level (and the resultant decreasing diluent flow rate) by adjusting the rate at which the pump device 41 pumps. The adjustment of the pumping rate of the pump device 41 can occur several times, for example 8-10 times, during the dispensing of concentrate/extract 12 and diluent 14 into a single beverage container. Alternatively, the decreasing diluent level in the reservoir 22 can be compensated for during dispensing by opening the control valve 18 wider or through the use of a pump, and the liquid concentrate/extract 12 can be dispensed from the cartridge 50 at a constant rate which is dependent only on the selected beverage strength.

Those skilled in the art will recognize that various numbers of different preset beverage strengths can be utilized and selected, for example through use of the input controls 90. Additionally, the beverage strength could be continuously variable, based on a user control with selected ranges shown as preferred for different types of beverages. Alternatively, a switch can be provided to allow a user to signal to the controller 80 which type of beverage is installed so that the controller 80 adjusts the amount of concentrate/extract 12 being dispensed accordingly. Various methods are known for identify the type of beverage concentrate/extract 12 that is in the cartridge 50, such as an affixed ID. IDs that are automatically recognized by the controller 80 through different shape or different indicia located on the cartridge 50 are available, which can be read by a contact sensor 37 located in the receiving area 31 when the cartridge 50 is installed. The ID 61 on the cartridge could also include a radio frequency identification (RFID) tag which communicates with the sensor 37, having an RFID reader, positioned as shown or anywhere in the receiving area 31. In one embodiment, the ID 61 on the cartridge could include a barcode or computer readable symbols readable by a barcode reader or other visual-type reader positioned in the receiving area 31. Alternatively, the ID 61 could include an alignment pin for activating one of a plurality of switches to inform the controller 80 which type of beverage is installed. Alternatively, one or more functional components, for example the pump device 41, can be shaped and/or sized to indicate a beverage type, the shape and/or size of the functional component being able to be sensed by a sensor in the cartridge receiving area 31.

In addition, as shown in FIG. 2, a container ID 11, for example an RFID, can be provided on the container 19 to be read by a sensor 13, for example an RFID reader, in the dispensing area 30. The container ID 11 preferably includes a user's beverage strength preference information. The beverage strength information can be preprogrammed or programmed by the user through use of an ID writer 15, for example an RFID writer in the dispensing area 30, and using the input controls 90 to indicate a user's beverage strength preference.

The controller 80 preferably records an amount of pumping cycles performed by the pump device 41 to determine the amount of concentrate/extract 12 dispensed. Accordingly, the controller 80 signals the LEDs 97a to indicate an amount of concentrate/extract 12 remaining in the cartridge 50. Further, the controller 80 preferably uses information received from the stack pipe 88 to signal the LEDs 99a to indicate a level of diluent 14 remaining in the reservoir 22.

Figure 14:
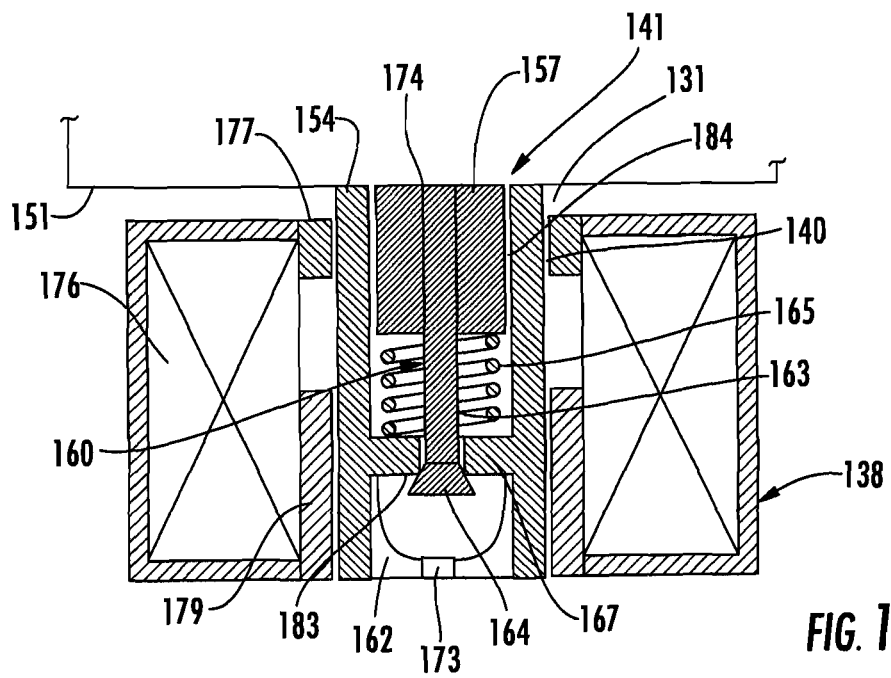
FIGS. 14-15 are cross-sectional views of a second embodiment of pump device for the cartridge liquid dispenser according to a second preferred embodiment of the present invention, shown in a dispensing actuator.
Figure 15:
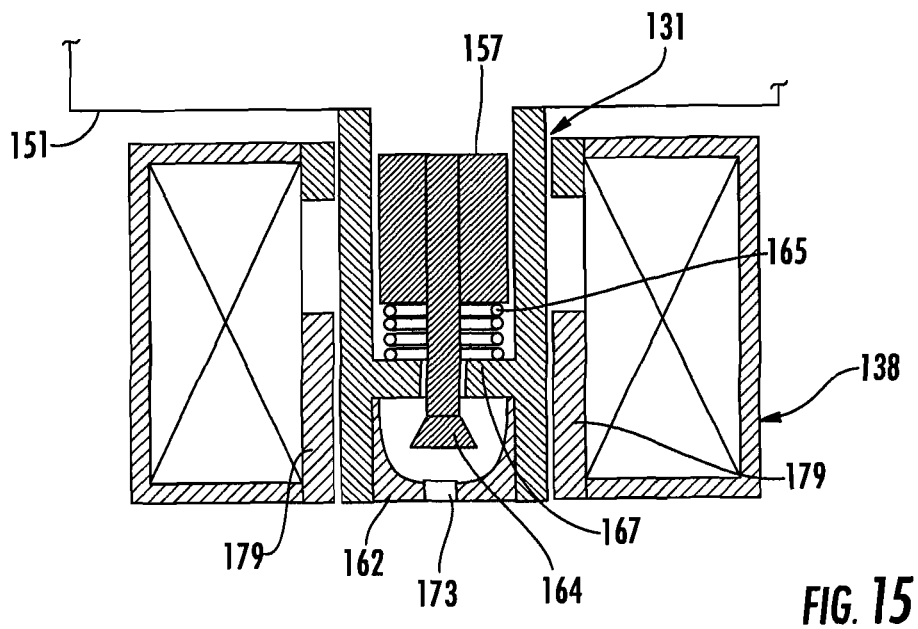

Referring to FIGS. 14-15, a second embodiment of a cartridge 150 with pump device 141 for use in a dispenser according to a second preferred embodiment of the present invention is shown. The second liquid/extract cartridge 150 dispenses a liquid extract in a dispensing area in a similar manner to the first cartridge 50. The dispenser has a cartridge receiving area 131 with an actuator 138 which is able to actuate the pump device 141 after insertion of the liquid extract cartridge 150. The method of actuation, however, differs from the first dispenser in that the actuator 138 has an electromagnet with a wound coil 176 for acting on a piston 157 locating inside the pumping device 141.

The pump device 141 preferably includes a dispensing tube 154, having an exit orifice 173 through an attached nozzle cap 162. The dispensing tube 154 is preferably sealably connected to the hollow body 151 in any suitable manner.

The pump device 141 includes a valve seat 167 connected to the dispensing tube 154. Preferably, the valve seat 167 is integrally formed with the dispensing tube 154. The valve seat 167 includes a port 183 for passing a flow of fluid concentrate/extract 12 through the dispensing tube 154. A valve stem 163 is connected to, and preferably integrally formed with, a valve body 164 forming a valve 160 for alternately covering and uncovering the port 183 in the valve seat 167. A piston 157 is connected to the valve stem 163 opposite the valve body 164 in slideable contact with or slightly spaced apart from the interior surface of the dispensing tube 154 for forcing the concentrate/extract 12 through the port 183. An annular gap 184 between the piston 157 and the dispensing tube 154 permits passing of a flow of the liquid concentrate/extract 12 from the hollow body 151 into the chamber formed between the valve seat 167 and the piston 157. The gap 184 preferably has a depth which is at least double its width to provide flow resistance at high piston velocities. An aperture 174 in the piston 157 permits assembly of the piston 157 with the valve stem 163. A spring 165 is disposed between the piston 157 and the valve seat 167 to maintain the valve body 164 in contact with the valve seat 167 and prevent a flow of fluid through the valve port 183. The piston 157 is formed of a ferromagnetic material, such as carbon steel, ferromagnetic stainless steel or iron, to permit actuation by a dispensing actuator 138, and can be coated with a food grade polymeric material. Preferably, the dispensing tube 154 and valve seat 167 are formed of a polymer material. The valve 160 and spring 165 are each preferably formed of a suitable non-ferromagnetic material, for example a polymer material or non-ferromagnetic stainless steel.

The orifice 173 of the attached nozzle cap 162 is preferably sized to permit a flow of concentrate/extract to be partially or completely atomized upon exit from the dispensing tube 154. The atomization of the fluid concentrate/extract 12 allows a more complete mixture of concentrate/extract 12 and diluent 14, preventing striping and assuring the mixture delivered to the dispensing area 30 is generally uniform and homogeneous.

The cartridge 150 dispenses the liquid concentrate/extract 112 as follows. Current is induced in the wound coil 176 by an applied voltage over the coil 176 as provided by the controller 80, causing the piston 157 to be drawn toward the electromagnetic center of the dispensing actuator 138 and against the valve seat 167. The valve body 164, which is fixed to the piston 157, follows in a downward motion with the piston 157 and is displaced from the port 183 in the valve seat 167. During the downward motion of the piston 157, liquid concentrate/extract 12 located between the piston 157 and the valve seat 167 is forced through the port 183, as it is uncovered by the valve body 164, and out through the exit orifice 173, while at the same time, fluid concentrate/extract 12 from the hollow body 51 is drawn into the area above the piston 157 in the dispensing tube 154. As described above, the hollow body 51 is preferably collapsible and collapses to facilitate the extraction of fluid concentrate/extract 12 from the hollow body. Next, the controller 80 cuts off voltage to the actuator 138, causing the piston 157 to move upwardly away from the valve seat 167 by force of the spring 165. During upward motion of the piston 157, fluid concentrate/extract flows from the area above the piston 157 through the annular gap 140 into an area between the piston 157 and the valve seat 167. A voltage, such as the preferred 24 volts direct current producing voltage, or other suitable AC or DC producing voltage, is cycled on and off to provide an intermittent current for repeating the above-described process continuously until a desired amount of the liquid concentrate/extract 12 is dispensed.

Figure 16:
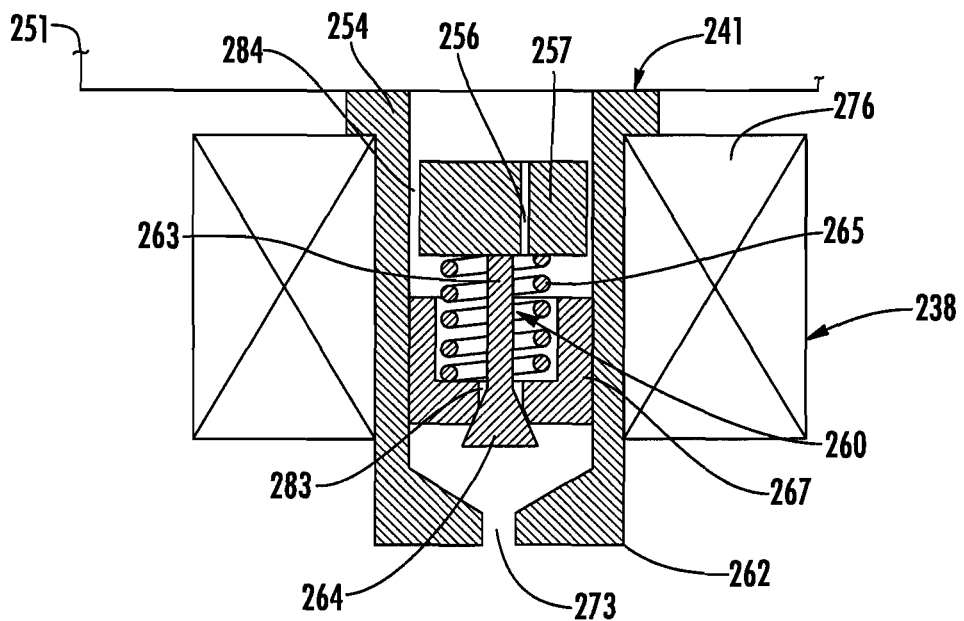
FIGS. 16-17 are cross-sectional views of third pump device for the cartridge liquid dispenser according to a third preferred embodiment of the present invention, shown in a dispensing actuator.
Figure 17:
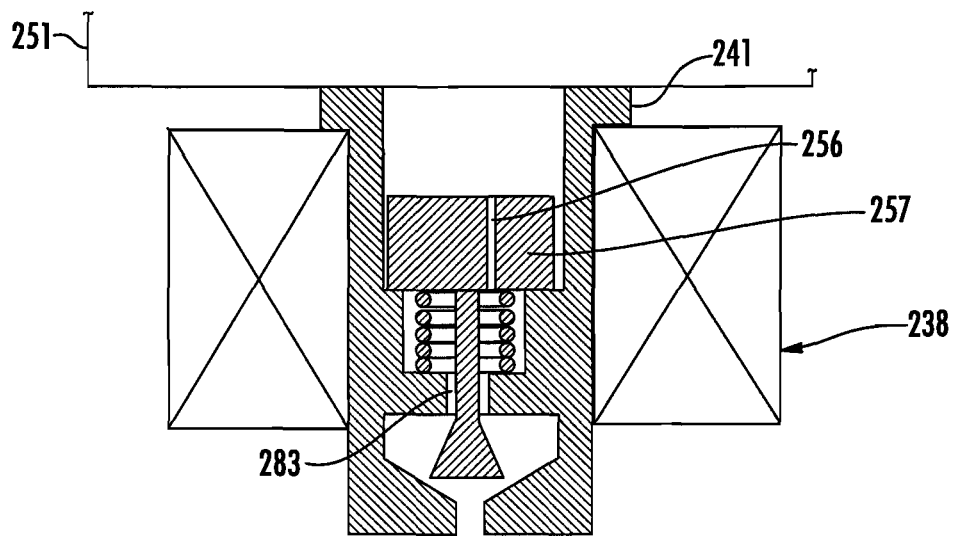
Figure 19:
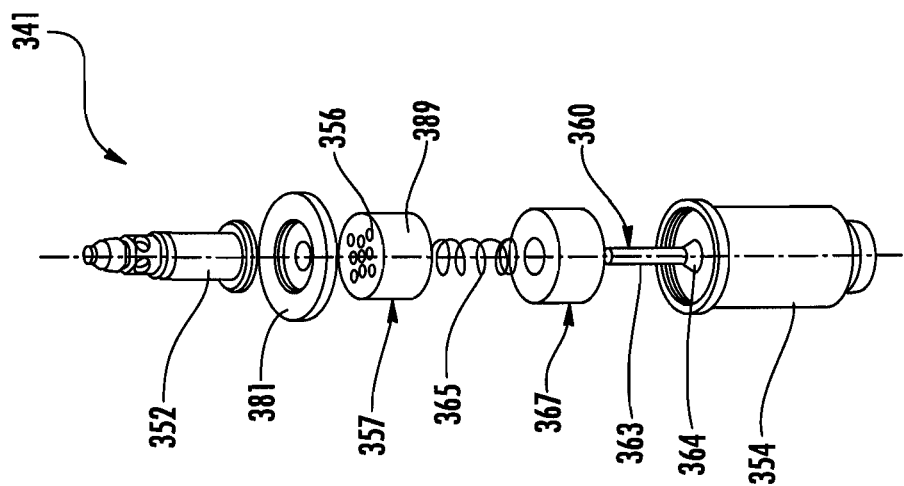
FIG. 19 is an exploded perspective view of the pump device of FIG. 18.
Figure 18:
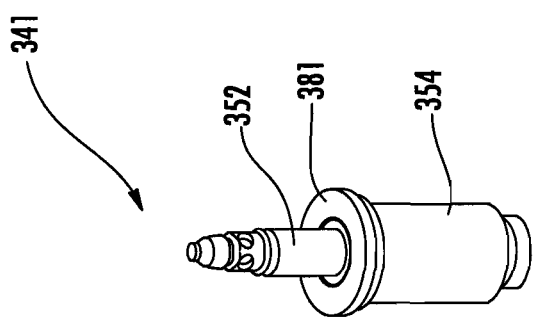
FIG. 18 is a perspective view of a fourth embodiment of a concentrate/extract pump device for use in a beverage dispenser according to a fourth preferred embodiment of the present invention.
Figure 20:
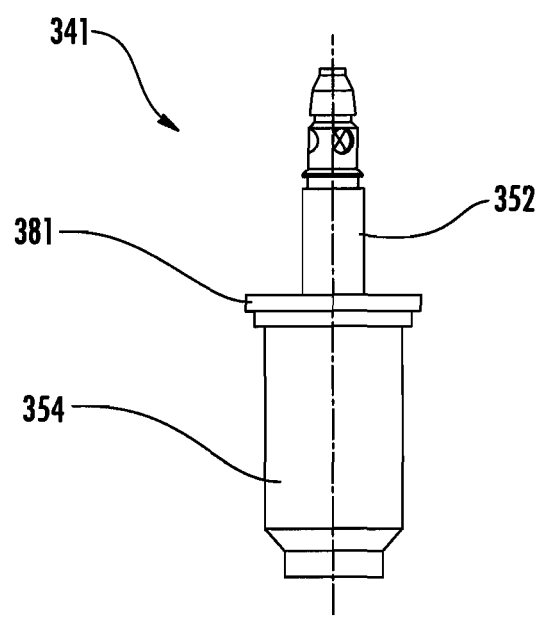
FIG. 20 is an elevational view of the pump device of FIG. 18.

Referring to FIGS. 16 and 17, a third embodiment of a cartridge 250 with a pump device 241 for use in a dispenser according to a third preferred embodiment of the present invention is shown. The pump device 241 functions in a manner similar to the pump device 141 described above. The pump device 241 preferably includes a dispensing tube 254, having an exit orifice 273 through an attached nozzle cap 262. The dispensing tube 254 is preferably sealably connected to the hollow body 251. In this embodiment, the dispenser 10 includes an actuator 238 having an electromagnet with a wound coil 276.

The pump device 241 includes a valve seat 267 connected to the dispensing tube 254 within a space defined by an interior surface of the dispensing tube 254. The valve seat 267 includes a port 283 for passing a flow of the fluid concentrate/extract 12 through the dispensing tube 254. A valve stem 263 is connected to, and preferably integrally formed with, a valve body 264 forming a valve 260 for alternately covering and uncovering the port 283 in the valve seat 267. A piston 257 is connected to the valve stem 263 opposite the valve body 264 in slideable contact with or slightly spaced apart from the interior surface of the dispensing tube 254 for forcing the concentrate/extract 12 through the port 283. An annular gap 284 between the piston 257 and the dispensing tube 254 and a through aperture 256 permit passing of a flow of the liquid concentrate/extract 12. Each of the gap 284 and the aperture 256 preferably has a depth which is at least double their respective widths to provide flow resistance at higher piston velocities. A spring 265 is disposed between the piston 257 and the valve seat 267 to maintain the valve body 264 in contact with the valve seat 267 and prevent a flow of fluid through the valve port 283. The piston 257 is formed of a ferromagnetic material to permit actuation by the actuator 238. Preferably, the valve seat 267 is also formed of a ferromagnetic material, and accordingly, functions as a pole piece such that when the wound coil is charged, magnetic flux generally perpendicular to a bottom surface of the piston 257 is formed. Preferably, the dispensing tube 254 is formed of a polymer material. The valve 260 and spring 265 are each preferably formed of a suitable non-ferromagnetic material, for example a polymer material or non-ferromagnetic stainless steel.

Referring to FIGS. 18-21, a fourth embodiment of a cartridge 350 with pump device 341 for use in a dispenser according to a fourth preferred embodiment of the present invention is shown. The pump device 341 preferably includes a dispensing tube 354, having an exit orifice 373. A top cap 381 is preferably attached to an end of the dispensing tube, and a male locking connector 352 is attached to the top cap 381.

Figure 21:
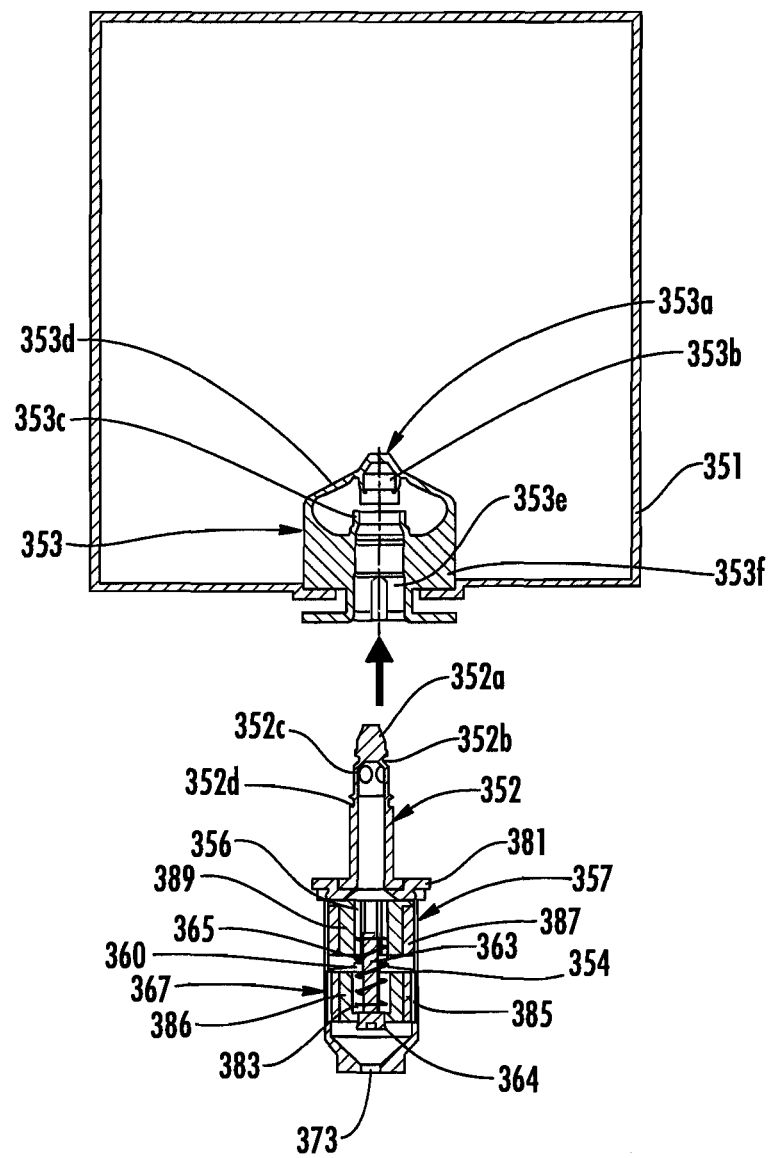
FIG. 21 is a sectional view of a concentrate/extract cartridge according to the fourth preferred embodiment of the present invention being assembled.

FIG. 21 shows an unassembled concentrate/extract cartridge 350 including the pump device 341 and a hollow body 351 in accordance with the fourth embodiment of the present invention. The male locking connector 352 preferably includes a conical head 352a, a circumferential groove 352b, cross passages 352c, and a ring shaped groove 352d for retaining a sealing ring. The locking connector 352 is connectable to a female mating connector 353 attached to the hollow body 351. The female mating connector 353 includes a plug 353a with a cavity 353b. The plug 353a is preferably removably or frangibly connected to a seat 353c located at an end of a bore 353e in a body 353f. In use, the male connector 352 is inserted into the bore 353e of the female connector 353 such that the conical head 352a of the male connector 352 enters the cavity 353b of the plug 353a. By inserting the male connector 352, the plug 353a is disconnected from the seat 353c allowing concentrate/extract 12 to flow from the hollow body 351, past flexible bodies 353d, through the cross passages 352c through the body of the connector 352 and into the dispensing tube 354.

The pump device 341 includes a valve seat 367 connected to the dispensing tube 354 within a space defined by an interior surface of the dispensing tube 354. The valve seat 367 includes a port 383 for passing a flow of fluid concentrate/extract 12 through the dispensing tube 354. A valve stem 363 is connected to, and preferably integrally formed with, a valve body 364 forming a valve 360 for alternately covering and uncovering the port 383 in the valve seat 367. A piston 357 is connected to the valve stem 363 opposite the valve body 364 and is in slideable contact with or slightly spaced apart from the interior surface of the dispensing tube 354 for forcing concentrate/extract 12 through the port 383. Through apertures 356 in the piston 357 permit a flow of the liquid concentrate/extract 12 to pass therethrough into a chamber formed beneath the piston 357. A spring 365 is disposed between the piston 357 and the valve seat 367 to maintain the valve body 364 in contact with the valve seat 367 and prevent a flow of fluid through the valve port 383.

Preferably, the valve seat 367 includes a first ferromagnetic material ring 385 encased in a first polymeric shell 386, and preferably the piston 357 includes a second ferromagnetic material ring 387 encased in a second polymeric shell 389. Accordingly, the valve seat 367 functions as a pole piece such that an actuator, for example the actuator 238 of the above-described third preferred embodiment, produces magnetic flux generally perpendicular to a bottom surface of the piston 357. The ferromagnetic material which forms the rings 385, 387 can include carbon steel, ferromagnetic stainless steel or iron. Preferably, the dispensing tube 354 is formed of a polymer material. The valve 360 and spring 365 are each preferably formed of a suitable non-ferromagnetic material, for example a polymer material or non-ferromagnetic stainless steel.

Functional efficiency of the concentrate/extract cartridge 350 of the fourth preferred embodiment (as well as the previously described concentrate/extract cartridges 50, 150, 250 of the first through third preferred embodiments) is dependent in part on the proper sizing of the respective components therein, particularly components involved in pumping operations. Each of the apertures 356 in the piston 357 preferably has a depth which is at least double its respective width to provide flow resistance at higher piston velocities. More preferably, each of the apertures 356 has a depth which is 3 to 5 times its respective width. Preferably, a piston flow through area, corresponding to a flow area through the apertures 356 added to a flow area through any annular gap between the outer perimeter of the piston 357 and the interior surface of the dispensing tube 354, is between 20% and 40% percent of a housing flow area, corresponding to the cross-sectional area bound by the circular perimeter of the interior surface of the dispensing tube 354. Also, it is preferred that a port flow through area, corresponding to the cross-sectional area through the port 383 minus the cross-sectional area of the valve stem 363 at the port is between 2% and 4% percent of the housing flow area. Further, it is preferred that an orifice flow through area, corresponding to a flow area through the orifice 373 is between 5% and 20% of the housing flow area, and more preferably in the range of 10% to 15%. The concentrate/extract cartridge 351 (as well as the cartridges of the other preferred embodiments described above) functions on the basis of fairly complex fluid dynamic relations. Accordingly, the actual dimensions of the components of the pump device 341 necessarily vary dependent on the type of concentrate/extract, and particularly the viscosity of the concentrate/extract, and the above-noted preferred relations may be less suitable certain fluids or certain scales of the pump device 341.

A representative preferred example of the pump device 341 is dimensioned as follows. Preferably, the housing 354 has an inner diameter of between 0.4 inch and 0.6 inch, and more preferably 0.52 inch. The piston 357 preferably has an outer diameter of between 0.3 inch and 0.5 inch and a length of between 0.2 inch and 0.4 inch, and more preferably a diameter of 0.49 inch and a length of 0.31 inch. The apertures 356 preferably have diameters of between 0.06 inch and 0.09 inch, and more preferably alternating diameters of 0.074 inch and 0.082 inch. The port 383 preferably has a diameter of between 0.09 inch and 0.17 inch, and more preferably a diameter of 0.13 inch. The orifice 373 preferably has a diameter of between 0.06 inch and 0.12 inch, and more preferably a diameter of 0.094 inch. The stem 363 preferably has a diameter at the port 383 of between 0.06 inch and 0.12 inch, and more preferably a diameter of 0.094 inch. The first ferromagnetic material ring 385 preferably has a volume of between 0.015 and 0.035 cubic inches, and more preferably has a volume of 0.026 cubic inches. The second ferromagnetic material ring 387 preferably has a volume of between 0.01 and 0.03 cubic inches, and more preferably has a volume of 0.018 cubic inches. The spring 365 preferably has a spring rate of between 0.8 and 1.2 pounds force per inch (lb/in). More preferably, the spring 365 has a spring rate of 0.99 pounds force per inch (lb/in), an outer diameter of 0.203 inch, an inner diameter of 0.179 inch, a free length of 0.5 inch, a wire diameter of 0.012 inch and 5.75 total coils. Due to the factors stated above, the preferred example may not be suitable for dispensing all fluid types, and components of the pump device 341 may have dimensions outside of the preferred ranges and still maintain functionality.

Figure 22:
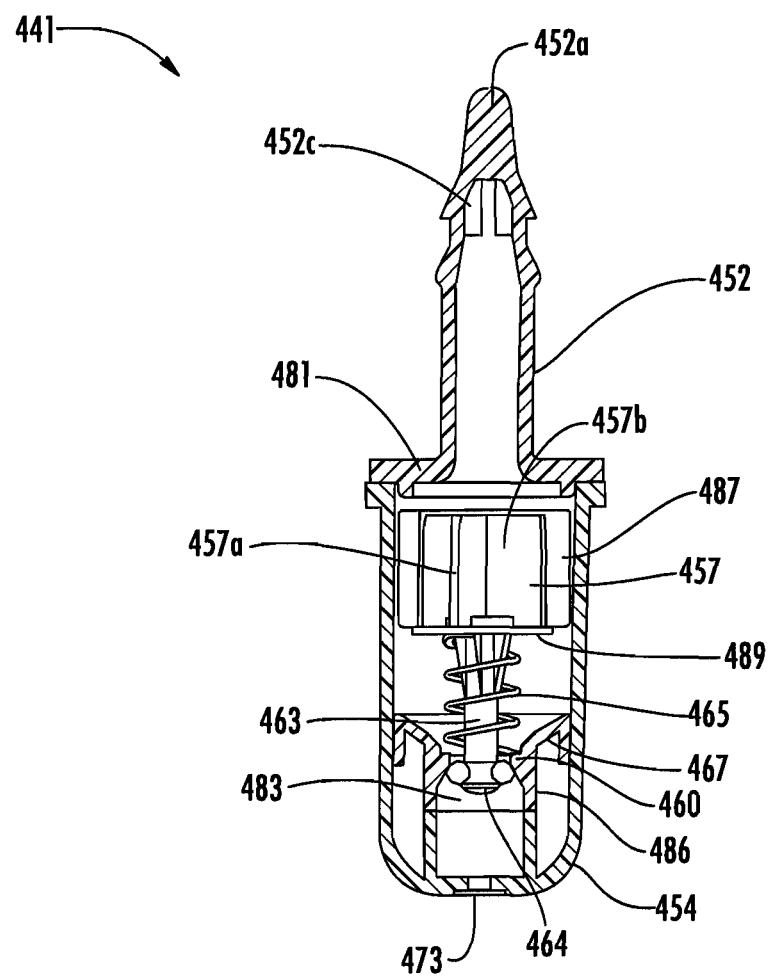
FIG. 22 is a cross-sectional view of a fifth pump device for a concentrate/extract cartridge for use in a liquid dispenser according to the invention.
Figure 23:
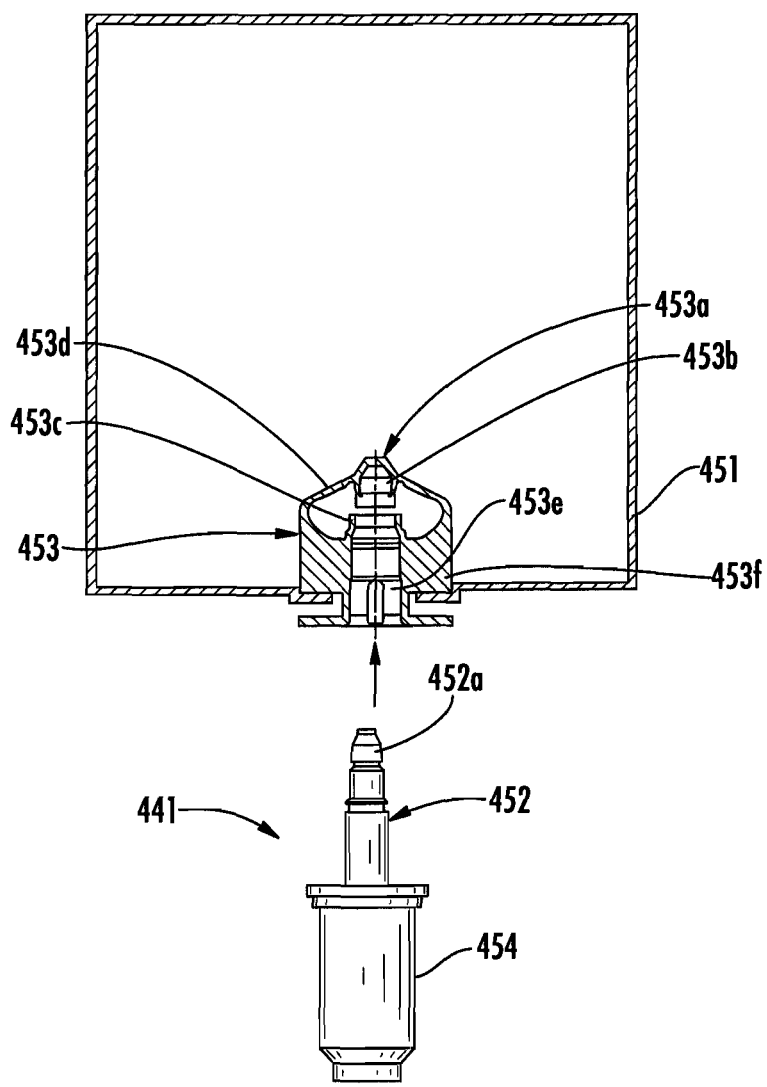
FIG. 23 is a cross sectional view of the concentrate/extract cartridge being assembled by inserting the pump device into the socket in the concentrate container.

Referring to FIGS. 22-23, a fifth embodiment of a cartridge 450 with pump device 441 for use in the dispenser 10 according a fifth embodiment of the present invention is shown. The pump device 441 preferably includes a dispensing tube 454, having an exit orifice 473. A top flange 481 is preferably attached to an end of the dispensing tube 454, and a male locking connector 452 is attached to the top flange 481. Depending on the specific arrangement, the dispensing tube 454 can be formed in one piece or a plurality of pieces that are connected together.

Figure 24:
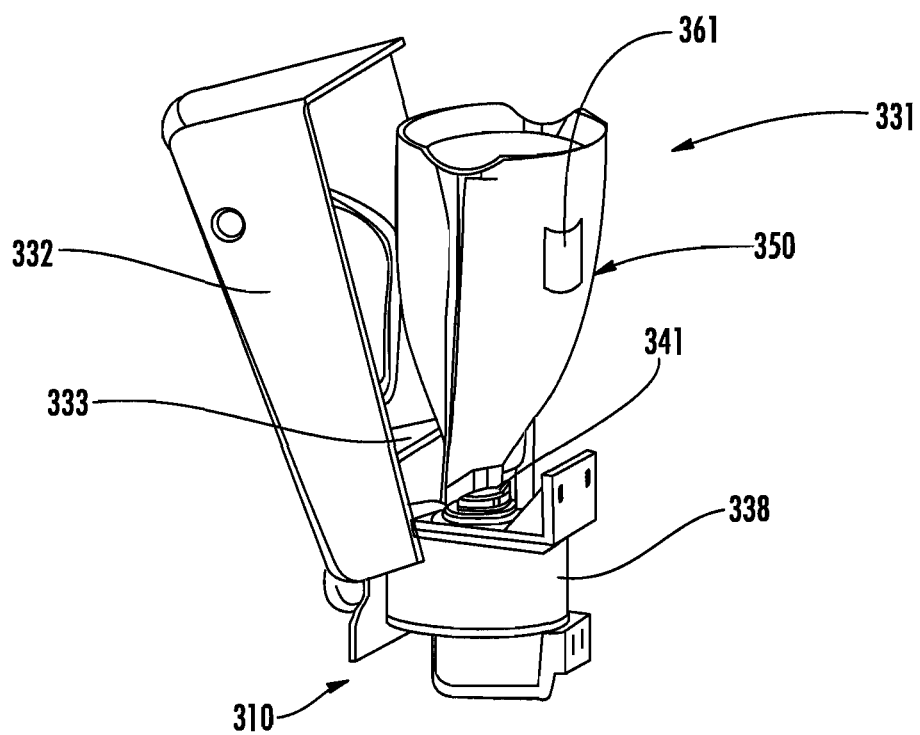
FIG. 24 is a perspective view of a dispensing assembly according to a sixth preferred embodiment with a loading door in an open position, the cartridge in a cartridge receiving area.

FIG. 23 shows an unassembled concentrate/extract cartridge 450 including the pump device 441 and a hollow container 451. (For the sake of clarity, pump device 441 is shown in FIG. 24 as a solid body. Details of the pump device 441 are illustrated in FIG. 22.) The male locking connector 452 preferably includes a conical head 452a and cross passages 452c. The locking connector 452 is connectable to a female mating connector 453 attached to the hollow body 451. The female mating connector 453 includes a plug 453a with a cavity 453b. The plug 453a is preferably removably or frangibly connected to a seat 453c located at an end of a bore 453e in a body 453f. In use, the male connector 452 is inserted into the bore 453e of the female connector 453 such that the conical head 452a of the male connector 452 enters the cavity 453b of the plug 453a. By inserting the male connector 452, the plug 453a is disconnected from the seat 453c allowing concentrate/extract 12 to flow from the hollow body 451, past flexible bodies 453d, through the cross passages 452c through the body of the connector 452 and into the dispensing tube 454.

The pump device 441 includes a valve seat 467 connected to the dispensing tube 454 within a space defined by an interior surface of the dispensing tube 454. The valve seat 467 includes a port 483 for passing a flow of fluid concentrate/extract 12 through the dispensing tube 454. A valve stem 463 is connected to, and preferably integrally formed with, a valve body 464 forming a valve 460 for alternately covering and uncovering the port 483 in the valve seat 467. The valve body 464 includes an o-ring 486 to provide a seal when the valve body 464 is in contact with the valve seat 467. A piston 457 is connected to the valve stem 463 opposite the valve body 464 in slideable contact with or slightly spaced apart from the interior surface of the dispensing tube 454 for forcing concentrate/extract 412 through the port 483. The piston 457 comprises fins 457a, and the voids 457b between the fins 457a permit passing of a flow of the liquid concentrate/extract 12. A spring 465 is disposed between an expanded portion of the valve stem 463 adjacent to the piston 457 and the valve seat 467 to maintain the valve body 464 in contact with the valve seat 467 and prevent a flow of fluid through the valve port 483. The piston 457 further includes a membrane 489 positioned above an upper end of the spring 465, which is at least one of moveable and/or flexible to permit a flow of fluid into the dispensing tube 454 when the valve body 464 is in contact with the valve seat 467 and, conversely, to forcibly express fluid from the dispensing tube 454 through the orifice 473 when the piston 457 is actuated (i.e., when the valve body 464 is not in contact with the valve seat 467) such that the fins 457a drive the membrane 489 downwardly. As shown in FIG. 22, in a preferred embodiment the spring 465 maintains the center portion of the membrane 489 against the fins 457a of the piston 457 and the circumferential periphery flexes up and down with movement of the piston 457 between open and closed positions. Alternatively, there may be a space between the spring 465 and the membrane 489. In the position shown in FIG. 22, the membrane 489 would shift downwardly allowing fluid to pass in the gap between the membrane 489 and ring 487 of the piston 457. Upon actuation, the piston 457 drives downwardly so that the membrane 489 is pressed against the bottom of the ring 487 for better pumping action.

The above described embodiments of the concentrate/extract cartridges and their related dispensers include a number of functional advantages over many of the known systems. The concentrate/extract cartridges 50, 150, 250, 350 and 450 allow the dispensing of precise amounts of concentrate/extract consistent and reproducible results. The cartridges 50, 150, 250, 350 and 450 include inexpensive components which allow them to be disposable in certain applications. The dispenser 10 can be adapted to use the actuator 138, 238 and use the cartridges 150, 250, 350, 450 and dispense a variety of other viscous fluids, besides the aforementioned hot coffee, tea and/or chocolate, or other beverage flavors, baby formula, fluid condiments, fluid medicine, detergents and laundry or cleaning additives and endless other food and non-food products. Also, the dispenser 10, if desired, could dispense viscous fluids into a container alone, without a diluent, for viscous fluids which do not require dilution. Further, the dispenser 10 could be incorporated into a multitude of other dispensing devices, for example, replaceable bottle office-style hot/cold water dispensers, and home and commercial refrigerators.

Figure 25:
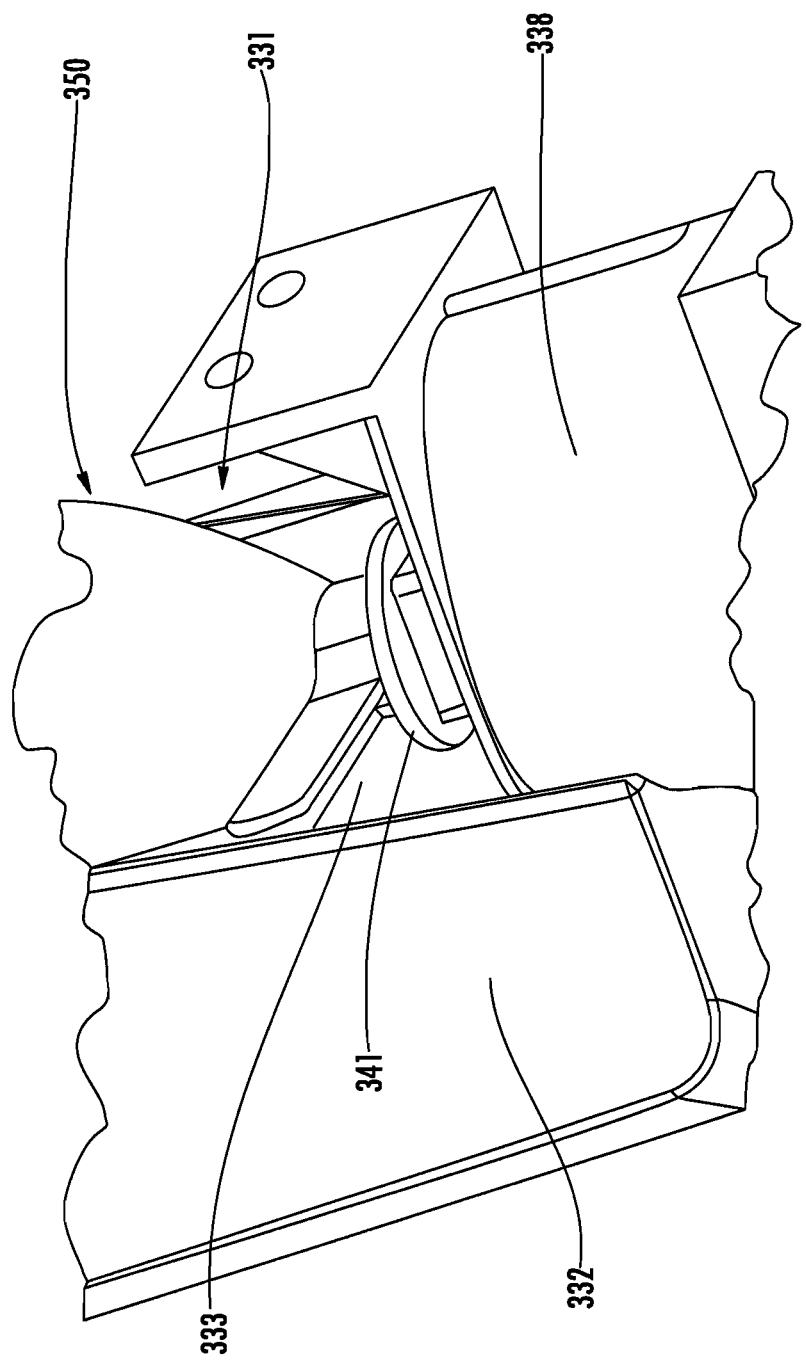
FIG. 25 is an enlarged perspective view of a portion of the cartridge receiving area of FIG. 24 showing the pump mechanism inserted in the activator body.

FIGS. 24 and 25 show the cartridge 350 with the pumping device 341 inserted in an accompanying cartridge receiving area 331 of a direct dispenser 310 in accordance with the sixth preferred embodiment of the present invention. This embodiment of the invention is capable of being installed into existing types of liquid mixing or dispensing systems to fulfill various regulated dispensing applications. In this embodiment, a loading door 332 is pivotably mounted to the dispenser 310 at a bottom portion of the loading door 332, similar to the loading door 32 described above. FIG. 25 shows the loading door 332 in an open position in which the concentrate/extract cartridge 350, preferably having an ID 361, can be loaded into the cartridge receiving area 331 with its pump device 341 being received in an actuator 338.

A separate controller or the controller of the existing equipment is provided to signal the actuator 338 with alternating or direct current in the same manner as discussed above in connection with the controller 80 to dispense liquid from the cartridge 350. FIG. 25 shows the door 332 in a closed position in which a retaining plate 333 rigidly attached to the door 332 contacts, or alternatively, resides in close proximity to a top portion of the pumping device 341 to retain the cartridge 350 in position. This configuration prevents the door from being closed when the concentrate/extract cartridge 350 is not properly positioned in the cartridge receiving area 331.

According to another embodiment of the dispenser for use with a concentrate extract cartridge 150, the dispensing actuator similar to actuator 138 is fixed within the cartridge receiving area 331. The dispensing actuator includes an electromagnet which preferably comprises a magnetic flux focusing ring and a pole piece 179, both made of ferromagnetic material, and a wound coil, which are same as those in the actuator 138. The electromagnet receives current, such as alternating or direct current, from the controller. In the preferred embodiment, the controller intermittently provides 24 volts over the coil to produce currents which induce an intermittent magnetic field.

The direct dispenser 310 can easily be modified for use with any of the different types of cartridges 50, 150, 250, 350, 450 described above by use of the associated actuator.

Figure 26:
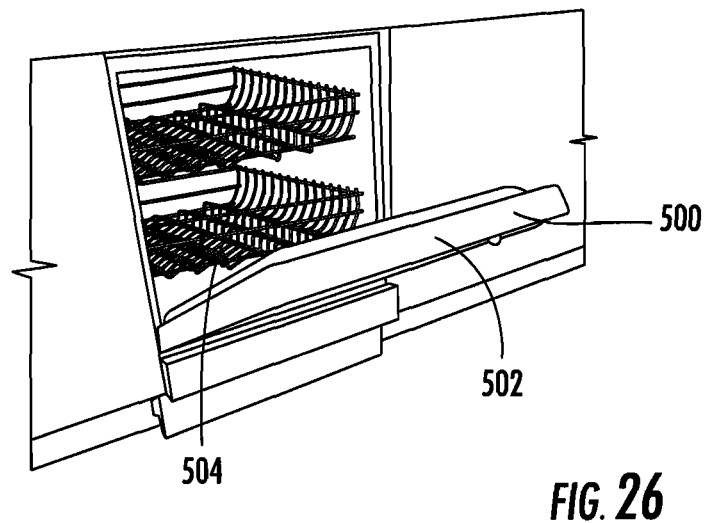
FIGS. 26-28 are left side perspective views of a dispensing assembly incorporated in a dishwasher according to a seventh preferred embodiment of the present invention.
Figure 27:
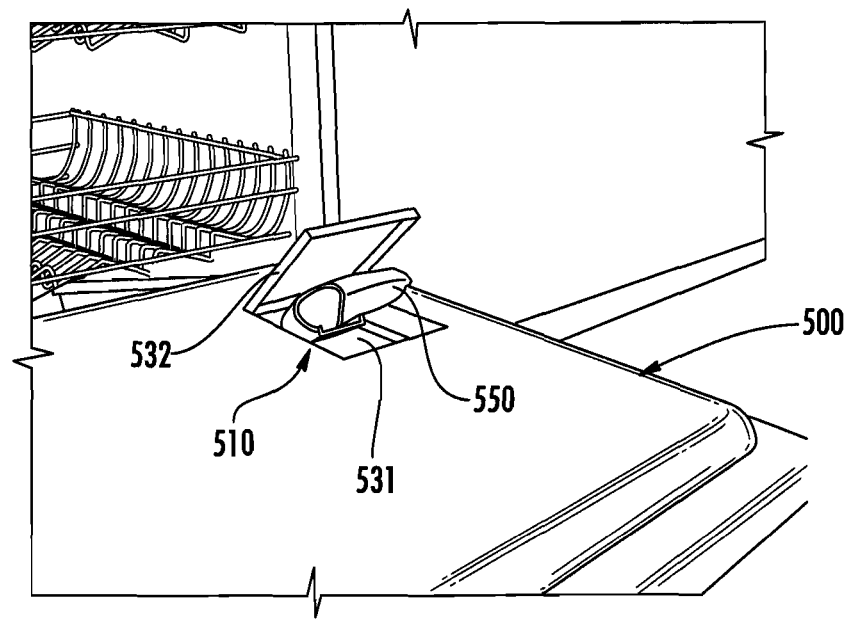
Figure 28:
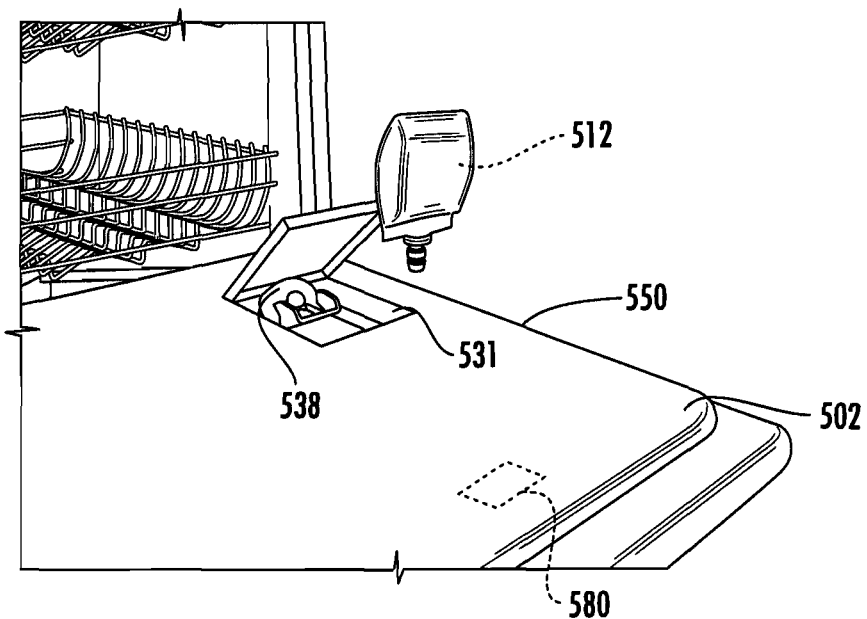

Referring to FIGS. 26-27, a dishwasher 500 according to a seventh preferred embodiment of the present invention is shown. The dishwasher 500 includes a liquid detergent dispenser 510, similar to the direct dispenser 310, adapted to dispense metered amounts of concentrated liquid detergent 512 from a cleaning agent cartridge 550. Alternatively, the cleaning agent cartridge 550 can include other cleaning agents, for example anti-spotting agents. The cleaning agent cartridge 550 is similar to any one of the concentrate/extract cartridges 50, 150, 250, 350 and 450 described above in the previous preferred embodiments.

The dishwasher 500 includes a main door 502 for access to a dish containment area 504. The dispenser 510 is preferably located in the main door 502, and includes a dispenser door 532 which opens into a cartridge receiving area 531 having an actuator 538 similar to the actuators 38, 138 described above. Alternatively, the dispenser 510 could be located in another position in the dishwasher 500, or could allow insertion from outside the dishwasher door 502. The cleaning agent cartridge 550, when loaded into the receiving area 531, is controlled by the actuator 538 to dispense liquid detergent 512 or another suitable cleaning agent into the dish containment area 504 during a wash cycle of the dishwasher 500. Preferably, a controller 580 controls an amount of liquid detergent 512 dispensed by the actuator 538, as well as timing of the dispensing, depending on a type of selected wash cycle. This can also be adjusted based on a sensor detecting the cleanliness of the articles that are washed so that additional detergent could be dispensed if needed.

Figure 29:
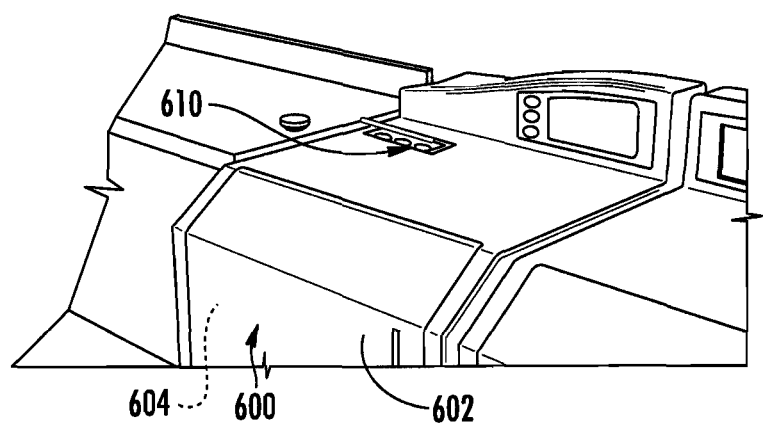
FIGS. 29-31 are perspective views of a plurality of dispensing assemblies incorporated into a clothes washer according to a eighth preferred embodiment of the present invention.
Figure 30:
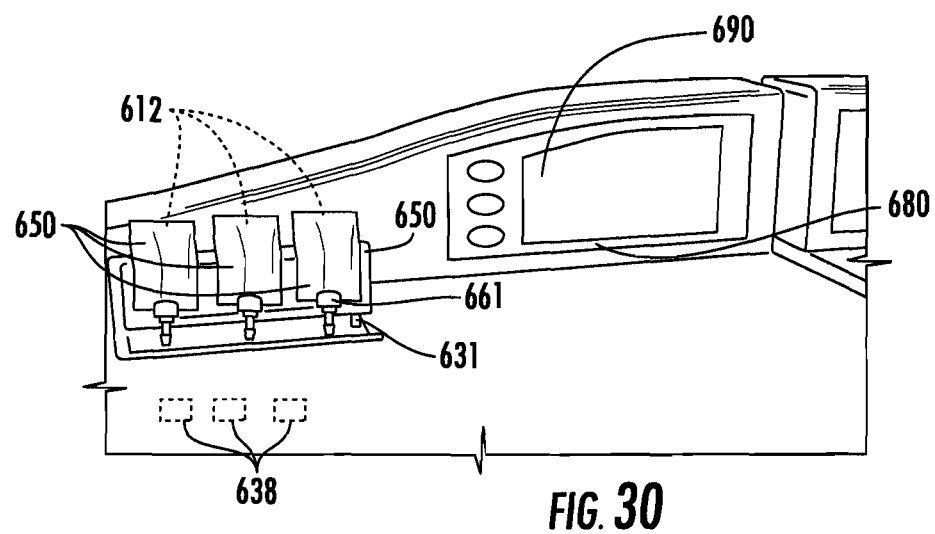
Figure 31:
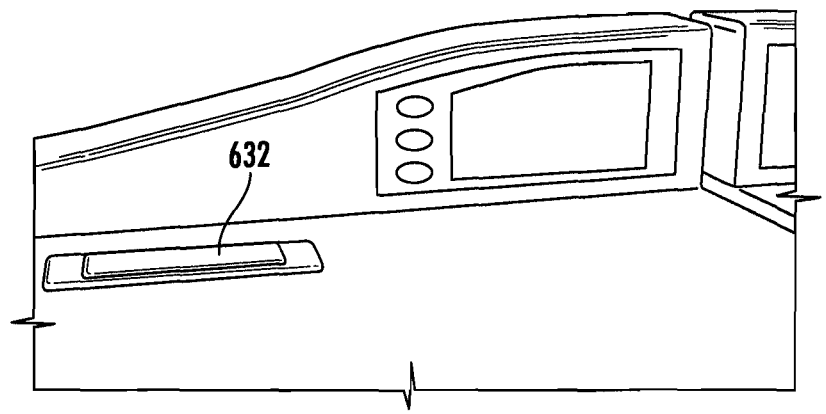

Referring to FIGS. 29-31, a clothes washer 600 according to an eighth embodiment of the present invention is shown. The clothes washer 600 includes a liquid laundry chemical dispenser 610, similar to the direct dispenser 310, adapted to dispense metered amounts of concentrated laundry chemicals 612 from laundry chemical cartridges 650. The laundry chemicals 612 can include detergent, fabric softener, bleach, water conditioner or any suitable laundry product. The laundry chemical cartridges 650 are similar to the cartridges 50, 150, 250, 350, 450 and 550 described above in the previous preferred embodiments.

The clothes washer 600 includes a main door 602 for access to a wash area 604. The dispenser 610 includes a loading door 632 which opens into a cartridge receiving area 631 having a plurality of actuators 638, each similar to the actuator 38, 138 described above in the first preferred embodiment, positioned therein. Each of the actuators 638 is adapted to control one of the cartridges 650, which are removably positioned in the receiving area 631. Alternatively, a single actuator 638 can be provided, and the cartridges 650 can be selectively positioned in proximity to the single actuator 638, for example using a mechanism such as the carousel 902 describes below. The laundry chemical cartridges 650, when loaded in the receiving area 631, are selectively controlled by the actuators 638 to dispense laundry chemicals 612 into the wash area 604 during a wash cycle of the clothes washer 600. Preferably, a controller 680 controls an amount of laundry chemicals 612 dispensed by the actuators 638, as well as timing of the dispensing, depending on a selected wash cycle. Additionally, sensors can be provided to determine the level of cleanliness during washing, and additional detergent can be added, as required, by the controller 680.

An ID 661 is preferably provided on each of the cartridges 650 to indicate what type of laundry chemical 612 is in each of the cartridges 650. The controller 680 preferably uses the information contained by the IDs 661 as well as information received by user inputs entered on a control panel 690 to dispense laundry chemicals 612 in appropriate amounts at appropriate times during a wash cycle. Preferably, the controller 680 determines the amount of laundry chemical 612 dispensed from each cartridge 650 by counting a number of cycles of the actuator 638 and signals the control panel 690 to notify a user when one or more of the cartridges 650 are nearly empty.

Figure 32:
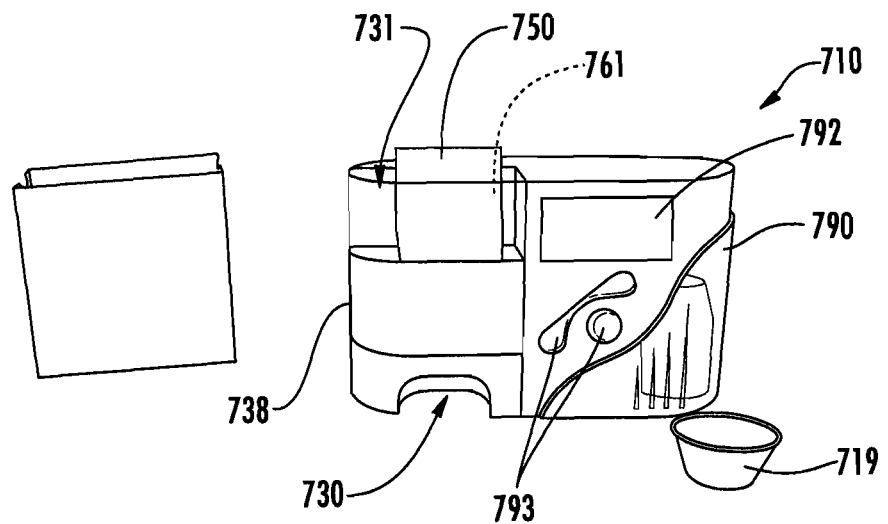
FIGS. 32-33 are perspective views of a dispensing assembly incorporated into a medicine dispenser according to an ninth preferred embodiment of the present invention
Figure 33:
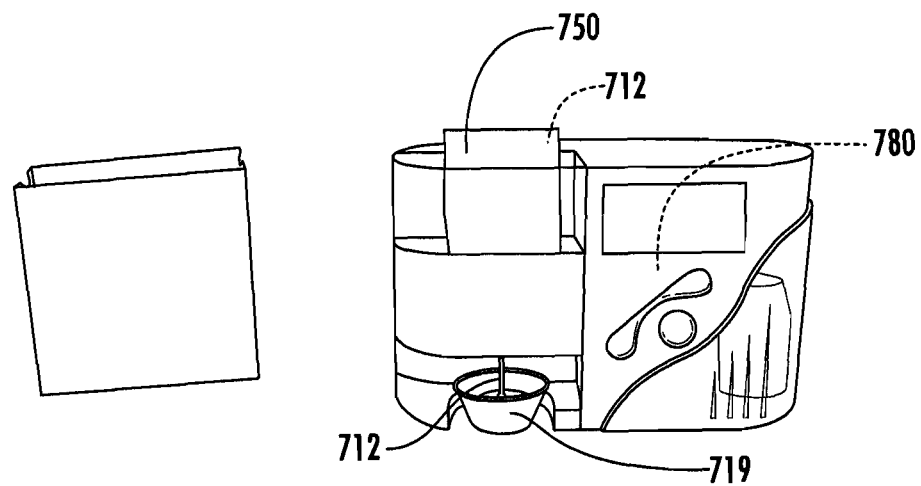

Referring to FIGS. 32 and 33, a medicine dispenser 710 according to a ninth preferred embodiment of the present invention is shown. The medicine dispenser 710 is similar to the dispense 310 and is adapted to dispense metered amounts of liquid medicine 712 from a medicine cartridge 750. The medicine 712 can include prescription or over-the-counter type medications for treating a variety of ailments. The medicine cartridge 750 is similar to the cartridges 50, 150, 250, 350, 450, 550 and 650 described above in the previous preferred embodiments.

The dispenser 710 includes a receiving area 731 having an actuator 738 similar to the actuator 38 described above in the first preferred embodiment. The medicine cartridge 750, when loaded in the receiving area 731, is controlled by the actuator 738 to dispense liquid medicine 712 into a container receiving area 730 where a medicine dosing container 719 receives the dispensed medicine 712.

Preferably, a controller 780 controls an amount of medicine 712 dispensed by the actuator 738. A unique ID 761 is preferably provided on each the cartridges 750 to indicate what type of medicine 712 is in the cartridge 750. Preferably, the ID 761 contains data which instructs the controller 780 to prompt a user with a display 792 to enter personal information using buttons 793 on a control panel 790. Entered personal information can include a user's age, weight, and height. The ID 761 can also contain data which instructs the controller 780 to prompt the user to enter information concerning the user's allergies or other drugs being taken by the user, to allow the controller to warn the user of potential side effects and adverse drug interactions. The controller 780 preferably uses a user's personal information along with information contained by the ID 761 to dispense an appropriate amount of medicine 712.

The controller 780 preferably determines the amount of medicine 712 dispensed from the cartridge 750 by counting a number of cycles of the actuator 738 and signals the control panel to notify a user when the cartridge 750 is nearly empty. The controller 780 can store in a memory information regarding the amount of medicine left in a plurality of different cartridges 750, associating each of the cartridges 750 with its unique ID 761, so the cartridges 750 can be rotated in and out of the dispenser 710 without affecting the stored memory.

Figure 34:
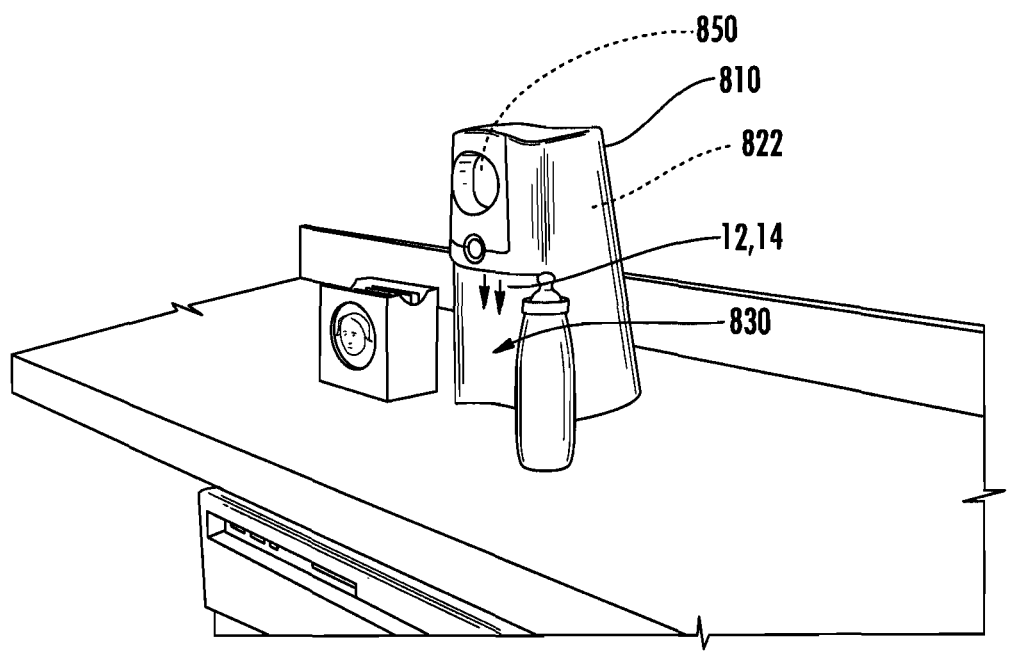
FIGS. 34-35 are perspective views of a dispensing assembly incorporated into a bottle-fed beverage dispenser according to a tenth preferred embodiment of the present invention.
Figure 35:
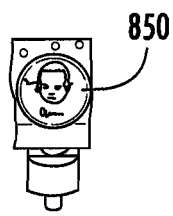

Referring now to FIGS. 34 and 35, a liquid dispenser 810 adapted to dispense a mixture comprising a baby formula liquid concentrate/extract (designated by arrows 12 in a dispensing area 830) and a diluent (in a reservoir 822 and designated by arrows 14) according to a tenth preferred embodiment of the present invention is provided. The dispenser 810 functions in a manner similar to the dispenser 10 described above. The dispenser 810 utilizes a concentrate/extract cartridge 850 which is preferably similar to one of the concentrate/extract cartridges described above in the previous embodiments. Preferably, the dispenser 810 includes a user programmable temperature control for the diluent, so that baby formula is dispensed at a desired temperature, as well as at a desired predetermined strength.

Figure 36:
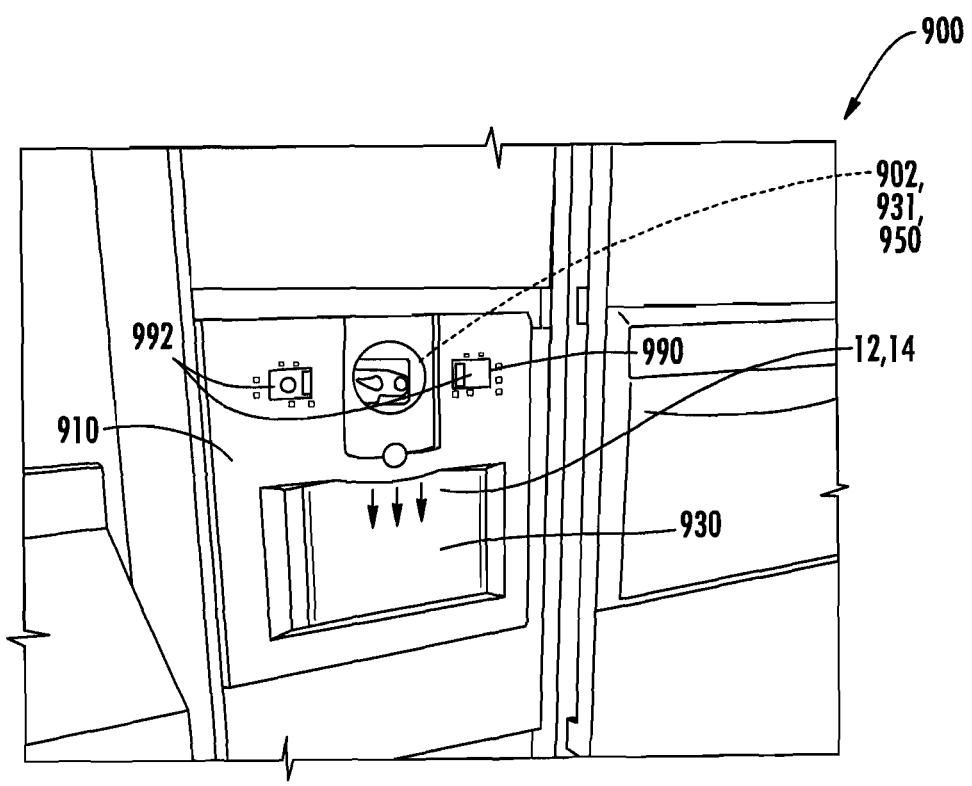
FIG. 36 is a perspective view of a liquid dispenser with a concentrate/extract cartridge incorporated into a refrigerator according to eleventh preferred embodiment of the present invention.
Figure 38:
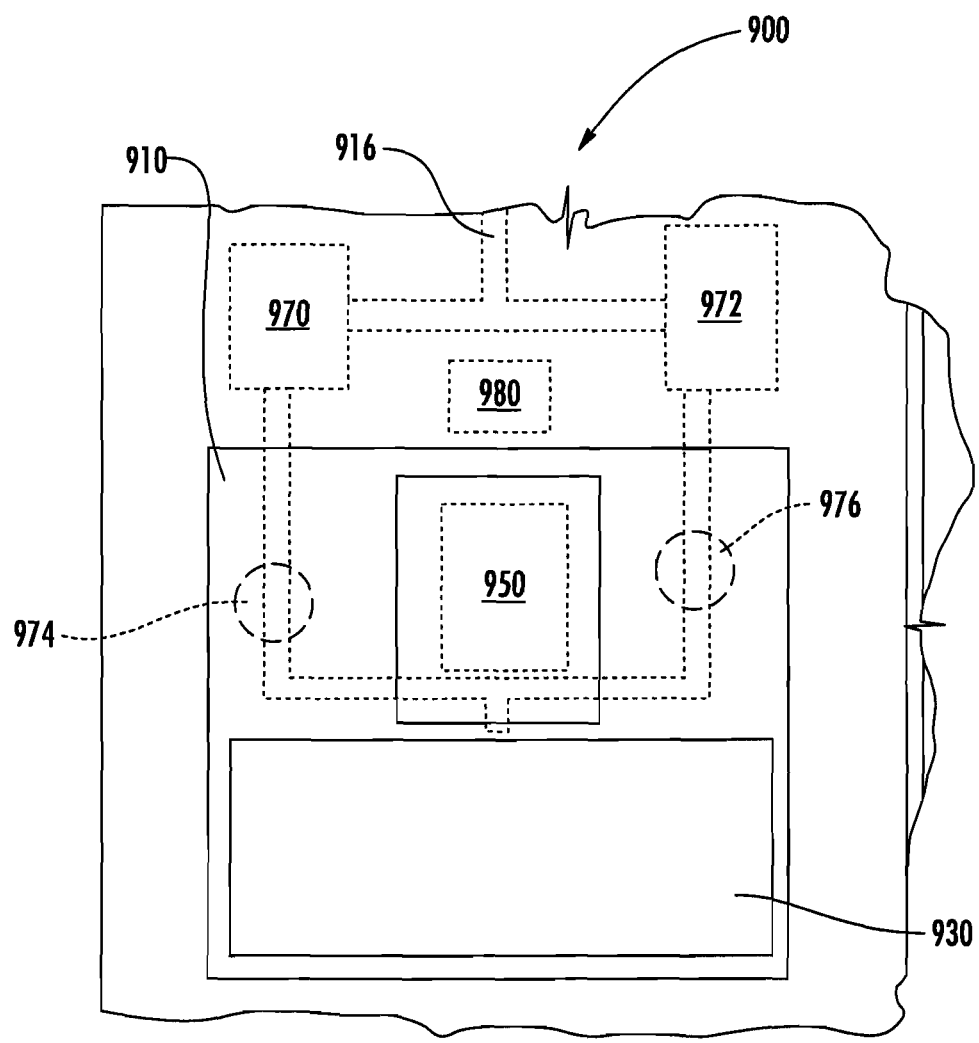
FIG. 38 is a partial front elevational view of the home appliance of FIG. 36.

Referring to FIGS. 36 and 38, a home appliance, preferably a refrigerator 900, according to an eleventh preferred embodiment of the present invention is shown. The refrigerator 900 includes a beverage dispenser 910 adapted to dispense a beverage comprising a liquid concentrate/extract (designated by arrows 12 in a dispensing area 930) and a diluent (designated by arrows 14). The dispenser 910 functions in a manner similar to the above discussed dispenser 10 and utilizes a concentrate/extract cartridge 950 which is preferably similar to one of the concentrate/extract cartridges 50, 150, 250, 350, 450, 550, 650, 750, 850. The refrigerator 900 preferably includes a supply line 916 connected to a home water line for providing a source of diluent 14, such as cold water, to the dispenser 910. Preferably, the supply line 916 preferably extends through a chiller 970, and a heater 972 can optionally be provided. Valves 974, 976 therefore allow a user to selectively dispense hot or cold diluent 14 to the dispensing area 330 based on inputs from a controller 980.

Figure 37:
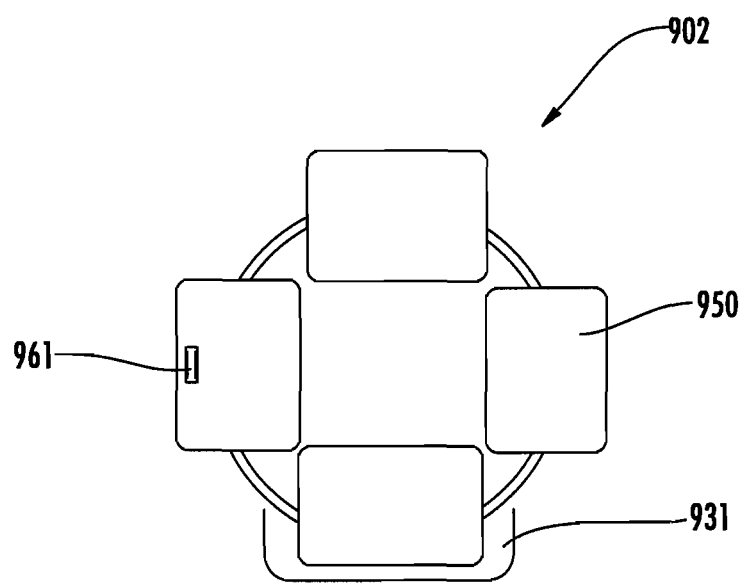
FIG. 37 is a top plan view of a concentrate/extract cartridge carousel included with the home appliance of FIG. 36.

The dispenser 910 can also include a cartridge carousel 902, as shown in FIG. 37, for storing multiple cartridges 950, and selectively rotating the cartridges 950 in and out of a cartridge receiving area 931 where concentrate/extract 12 from the cartridges 950 can be dispensed. User input controls 390, are provided to signal the controller 980 to rotate the carousel 902 to dispense a concentrate or extract from a desired one of the cartridges 950. Controls 990 are also preferably used to vary the strength of the beverage and to choose whether hot or cold diluent 14 is to be mixed with the concentrate/extract 12 from the chosen cartridge 950. Input controls 990 are preferably used to enter preferred beverage properties when a particular one of the cartridges 950 is first loaded onto the carousel 902, such that the controller 980 dispenses a beverage with preferred properties associated with the particular cartridge 950 each time that the particular cartridge 950 is selected and positioned in the receiving area 931 by the carousel 902. Preferably, an ID 961 is provided on each of the cartridges 950 to indicate the type of beverage concentrate/extract 12 that is in each of the cartridges 950. The controller 980 preferably uses the information contained by the ID 961 as well as information received by user inputs to dispense concentrate/extract 12 and hot or cold diluent 14 in appropriate proportions. Visual indicators such as digital displays 992 indicate a selected beverage type and/or selected beverage preferences.

Figure 39:
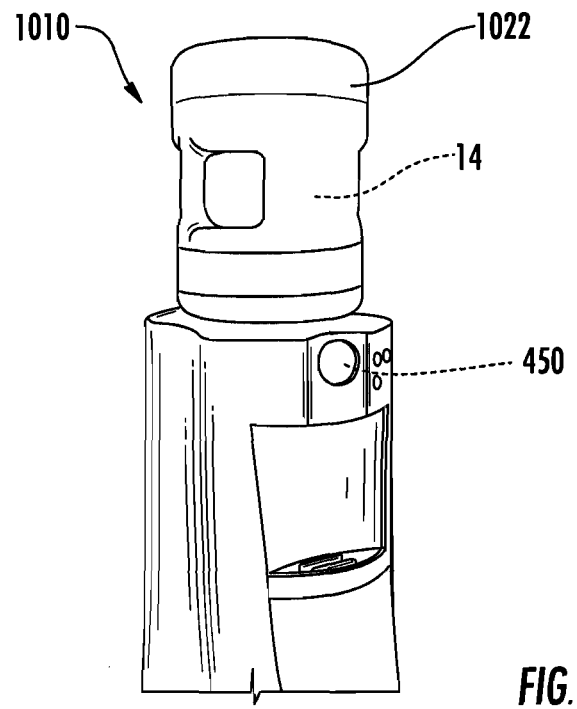
FIGS. 39-40 are perspective views of a dispensing assembly incorporated into a bottle-fed beverage dispenser according to a twelfth preferred embodiment of the present invention.
Figure 40:
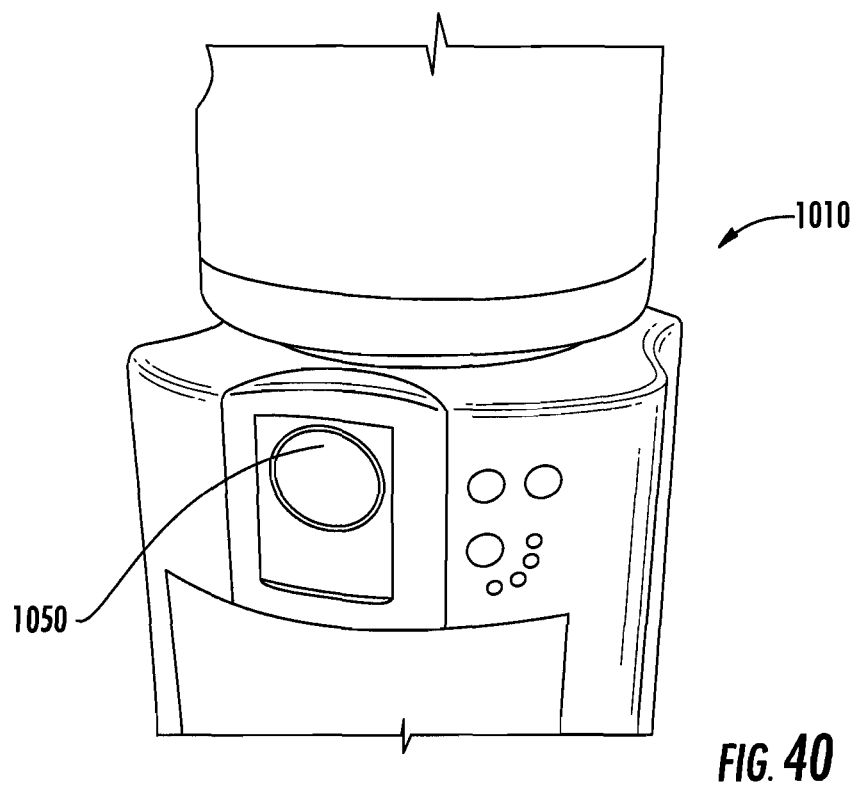

Referring to FIGS. 39-40, a bottle-fed beverage dispenser 1010 according to a twelfth preferred embodiment of the present invention is shown. The dispenser 1010 is adapted to dispense a beverage comprising a liquid concentrate/extract (designated by arrows 12 in a dispensing area 1030) and a diluent (designated by arrows 14). The dispenser 1010 functions in a manner similar to the dispenser 10 and utilizes a concentrate/extract cartridge 1050 which is preferably similar to any of the concentrate/extract cartridges discussed above. A supply of diluent 14 is held in a replaceable bottle 1022 of the type typically used in known bottle-fed water dispensers.

The above described preferred embodiments of the present invention include a number of functional advantages over many of the known dispensing systems. The concentrate/extract cartridges 50, 150, 250, 350, 450, 550, 650, 750, 850, 950, and 1050 allow the dispensing of precise amounts of liquid with consistent and reproducible results. The cartridges 50, 150, 250, 350, 450, 550, 650, 750, 850, 950, and 1050 include inexpensive components which allow them to be disposable in certain applications. The dispensers 10, 310, 510, 610, 710, 810, 910 and 1010 can be adapted to hold and dispense a variety of viscous fluids besides those mentioned.

While the preferred embodiments of the invention have been described in detail above, the invention is not limited to the specific embodiments described which should be considered as merely exemplary. Further modifications and extensions of the present invention may be developed and all such modifications are deemed to be within the scope of the present invention as defined by the appended claims.

What is claimed is:
1. An appliance including a dispenser for a liquid and comprising:
    a housing including a dispensing area for dispensing a fluid;
    a cartridge receiving area in the housing;
    an electromagnetic dispensing actuator located in the housing;
    a concentrate/extract cartridge removably insertable into the cartridge receiving area in a position to be actuated by the dispensing actuator, the concentrate/extract cartridge adapted to hold a fluid to be dispensed into the dispensing area after placement into the cartridge receiving area, the concentrate/extract cartridge comprising:
        a hollow body adapted to contain the fluid to be dispensed;
        a dispensing tube connected to the hollow body;
        a piston located in the dispensing tube; and
        a valve having a first end extending through an opening in the piston, a valve stem having a first end and a second end and that passes through a port of a valve seat integrally formed with the dispensing tube, the port defining a flow passage through the dispensing tube, and a valve body located at the second end of the valve stem in removable contact with the valve seat, for alternately opening and closing the port; and
    a controller located in the housing to control the actuator to discharge the fluid to be dispensed from the cartridge, wherein the dispensing tube includes a top and bottom flexing member, and the piston is connected to an intermediate portion of the dispensing tube between the top and bottom flexing members, the valve seat is located on a side of the piston facing the valve body, and the piston being moveable up and down through flexing of the top and bottom flexing members.

2. The appliance of claim 1, wherein the valve body comprises an o-ring to provide a seal with the valve seat when the valve body is closed.

3. The appliance of claim 1, further comprising a diluent supply line connected to at least one of a pump and a control valve for delivering a stream of diluent with the fluid, wherein the dispensing tube of the concentrate/extract cartridge is positioned to deliver a stream of the fluid into the stream of the diluent.

4. The appliance of claim 3, further comprising a joining tube connected to the diluent supply line and removably connected to the dispensing tube of the concentrate/extract cartridge, wherein the diluent supply line is positioned to deliver a stream of diluent into the joining tube generally perpendicular to a stream of concentrate/extract delivered into the joining tube by the dispensing tube.

5. The appliance of claim 1, wherein an exit orifice of the dispensing tube is sized between 0.04 inch and 0.12 inch in diameter, whereby a flow of concentrate/extract exiting the dispensing tube is substantially atomized.

6. The appliance of claim 1, wherein the dispensing actuator includes an aperture for removably receiving the dispensing tube of the concentrate/extract cartridge, and the beverage dispenser further comprises a loading door which includes a retaining plate, the loading door being pivotably attached to the housing, wherein in a closed position of the loading door, the retaining plate holds the dispensing tube within the aperture in the actuator to retain the concentrate/extract cartridge in the housing, and wherein in an open position of the loading door, the concentrate/extract cartridge is removable from the housing.

7. The appliance of claim 1, wherein the appliance is a refrigerator or a water cooler, and the dispensing tube is directed toward a water outlet, the controller controls the dispensing actuator such that the fluid from the concentrate/extract cartridge is dispensed as the water is dispensed from the appliance.

8. The appliance of claim 5, wherein the controller controls other appliance functions, such as temperature.

9. The appliance of claim 1, wherein the appliance is a dish washer or a washing machine, and the controller controls the washing cycle and the dispensing of a predetermined or programmable amount of fluid from the cartridge in accordance with a predetermined time in the washing cycle.

10. The appliance of claim 1, wherein the appliance is a baby formula dispenser, and the controller controls an amount of the fluid being dispensed from the cartridge, and a temperature of baby formula dispensed.

11. The appliance of claim 1, wherein the appliance is a medicine dispenser, and the controller controls an amount of medicine dispensed based on input parameters.

12. A concentrate/extract cartridge for a fluid dispenser adapted to dispense a fluid, the cartridge comprising:
- a hollow body;
- a dispensing tube connected to the hollow body, the dispensing tube includes a top and bottom flexing member, and a piston is connected to an intermediate portion of the dispensing tube between the top and bottom flexing members; and
- a valve having a valve stem that passes through a port of a valve seat formed in the piston, the port defining a flow passage through the dispensing tube, a valve body located at a second end of the valve stem in removable contact with the valve seat, for alternately opening and closing the port, the valve stem extends through an opening in the piston and the valve seat is located on a side of the piston facing the valve body, the piston being moveable up and down through flexing of the top and bottom flexing members;
- wherein the piston has a piston flow through area, corresponding to a flow area of through apertures in the piston added to a flow area through an annular gap between the outer perimeter of the piston and an interior surface of the dispensing tube, of between 20% to 40% of a flow area defined by the interior surface of the dispensing tube, and the through apertures have a depth which is three to five times their respective width.

13. The appliance of claim 1, wherein the appliance is selected from the group consisting of a refrigerator, a water cooler, a dish washer, a washing machine, a baby formula dispenser and a medicine dispenser.

* * * * *